United States Patent

Gross et al.

[11] Patent Number: 6,161,138
[45] Date of Patent: *Dec. 12, 2000

[54] MEDIA ACCESS CONTROL FOR ISOCHRONOUS DATA PACKETS IN CARRIER SENSING MULTIPLE ACCESS SYSTEMS

[75] Inventors: Kevin P. Gross; Charles W. Anderson; Derek W. Lieb, all of Boulder; Gerrit E. Rosenboom, Lafayette; William W. Lowe, Louisville, all of Colo.

[73] Assignee: Peak Audio, Inc., Boulder, Colo.

[ * ] Notice: This patent is subject to a terminal disclaimer.

[21] Appl. No.: 09/088,920

[22] Filed: Jun. 2, 1998

Related U.S. Application Data

[63] Continuation-in-part of application No. 08/630,066, Apr. 12, 1996, Pat. No. 5,761,430.
[51] Int. Cl.[7] .............................. G06F 13/38; G06F 15/17
[52] U.S. Cl. .......................... 709/225; 370/433; 370/438
[58] Field of Search ........................... 709/225; 370/433, 370/438

[56] References Cited

U.S. PATENT DOCUMENTS

| | | | |
|---|---|---|---|
| 5,229,993 | 7/1993 | Fondriat et al. | 370/445 |
| 5,361,261 | 11/1994 | Edem et al. | 370/445 |
| 5,528,513 | 6/1996 | Vaitzblit et al. | 395/673 |
| 5,553,071 | 9/1996 | Aranguren et al. | 370/445 |

*Primary Examiner*—Zarni Maung
*Assistant Examiner*—Farzaneh Farahi
*Attorney, Agent, or Firm*—Dorsey & Whitney LLP

[57] ABSTRACT

The present invention has solved the collision problems in a CSMA network protocol and at the same time optimized performance of the network. This is accomplished by giving control of the size of the reserved portion and the size of the reservation portion of the communication frame to stations in the network. Further, the reserved portion is allotted to isochronous data packets each of whose length is variable. Also, only those packets that have a reservation are in the frame, and they are placed in the frame in order in accordance with there position of the permission or reservation list.

The network timing is controlled by one of the stations acting as a conductor for the network. This conductor station receives the reservation requests from the other stations and builds a beat packet. The beat packet is transmitted from the conductor station to all stations of the network, and provides the timing or beat of the network that all stations are synchronized with. In addition, the beat packet contains the permission list (reservation list) identifying the stations that will transmit, and the order they will transmit during the frame. The network interrupt handler (46) and the conductor (56) at the conductor station build this beat packet.

5 Claims, 15 Drawing Sheets

MEDIA ACCESS CONTROL FOR ISOCHRONOUS DATA PACKETS IN CARRIER SENSING MULTIPLE ACCESS SYSTEMS

CROSS REFERENCE TO RELATED APPLICATION

This application is a continuation-in-part of application Ser. No. 08/630,066, filed Apr. 12, 1996, now U.S. Pat. No. 5,761,430 entitled "MEDIA ACCESS CONTROL FOR ISOCHRONOUS DATA PACKETS IN CARRIER SENSING MULTIPLE ACCESS SYSTEMS. This application is related to the following co-pending, commonly assigned patent application of K. Gross, C. Anderson, and D. Lieb, entitled "ORDER PERSISTENT TIMER FOR CONTROLLING EVENTS AT MULTIPLE PROCESSING STATIONS", Ser. No. 08/631,067 and filed concurrently herewith, the disclosure of which is incorporated herein by reference in its entirety.

BACKGROUND OF THE INVENTION

1. Field of the Invention

This invention relates to a media access control for handling transmission and reception of isochronous data and asynchronous data. More particularly, the invention relates to preventing collisions during the transmission of isochronous data in carrier sensing multiple access transmission systems.

2. Description of Related Art

With the advent of multimedia processing in computing systems and increased deployment of digital audio and video formats, there is an increased demand for reliable transmission of synchronous and isochronous data over standard computer networks. Audio and video are but examples of synchronous or isochronous data. Any data stream that must be clocked and continuous would be considered synchronous. A data stream which must be delivered with determinant latency could be considered isochronous.

Local area networks, such as Ethernet, were developed to carry computer data. Computer data is primarily asynchronous in nature, and is not highly sensitive to non-deterministic latencies. Ethernet uses a carrier sense multiple access with collision detection media access control protocol (CSMA/CD MAC). This type of MAC is characterized by very low typical latencies, and reasonably high potential throughput.

The shortcomings of Ethernet for the transmission of synchronous and isochronous data are in it's potentially high latencies when collisions occur between stations transmitting on the network. Numerous schemes have been developed for the transmission of synchronous and isochronous data over multiple access transmission systems. A reservation system typically employs two communications channels; one channel, the reservation channel, is used to communicate reservation requests from individual stations to a central authority which then allocates bandwidth in the primary channel, as requested, if possible. The reservation channel typically carries asynchronous data, while the primary channel carries isochronous data. Several schemes have been previously devised to implement a reservation system on a single multiple access channel. These schemes involve time dividing the channel into "frames" and further subdividing the frames to create the two channels required for a reservation system. One such system divides a frame into two Time Division Multiplexed (TDM) regions, one for the primary channel and one for the reservation channel. Another scheme splits frames into a TDM primary channel region and a CSMA reservation region. To date, there is no solution to collision problems in a CSMA protocol without significant inefficiencies in transmission.

SUMMARY OF THE INVENTION

The present invention solves the latency problem by essentially eliminating collisions for synchronous and isochronous data on an Ethernet network. The current invention differs from previous schemes in that it works on an unmodified Ethernet network using standard Ethernet transceivers and controllers augmented by a simple timing circuit. The current invention also differs from previous schemes in that the boundary between the primary and reservation regions of the frame floats allowing the relative bandwidths allocated to the primary and reservation channels to balance dynamically as traffic conditions vary in time.

During the reservation portion of the frame an "adaptive p-persistent" MAC is employed.

During the primary channel region of the frame, the current invention utilizes an "ordered persistent" or "o-persistent" MAC.

The present invention has solved the collision problems in a CSMA network protocol and at the same time optimized performance of the network. This is accomplished by giving control of the size of the reserved portion and the size of the reservation portion of the communication frame to stations in the network. Further, the reserved portion is allotted to isochronous data packets each of whose length is variable. Also, only those packets that have a reservation are in the frame, and they are placed in the frame in order in accordance with their position on the permission or reservation list. The present invention solves these problems regardless of whether the network is implemented using land lines, such as twisted-pair cable or coaxial cable, wireless, satellite, etc.

In addition to its applicability to CSMA communications networks, the present invention is also applicable to use on certain contention free communications media such as token passing networks. Although the order based reservation and transmission system of the present invention is not required to prevent collisions in such networks, the system is still advantageous as a framework for balancing resource allocation amongst multiple isochronous and asynchronous data sources and thereby maximizing throughput and efficiency.

An order persistent timer is provided in each station to control the timing of transmission of each isochronous data packet from a station and to also control the timing of transmission of asynchronous data packets that include reservation requests. The OP timer at each station monitors traffic in the network from other stations to detect whether the network is active or idle. In an active state, the OP timer times a set interval of time sufficient to indicate the successful transmission of a packet on the frame. In the idle state (no packet on the network from another station), the OP timer times a number of deferral time intervals that are used with a network interrupt handler at the station to control the transmission of isochronous data packets without collision, and asynchronous data packets thereafter.

Another embodiment of the current invention can be achieved without the o-persistence or an OP timer. In this embodiment, transmission on the network can be determined by counting packets following the beat packet or waiting to receive a designated previous transmission. The packet counting function of the timer can be achieved through other means. The deferral timing function is simply a means to assure continued smooth operation of the network in the event of individual transmitter failure.

The network timing is preferably controlled by one of the stations acting as a conductor for the network. This conductor station receives the reservation requests from the other stations and builds a beat packet. The beat packet is transmitted from the conductor station to all stations of the network, and provides the timing or beat of the network that all stations are synchronized with. In addition, the beat packet contains the permission list (reservation list) identifying the stations that will transmit, and when they will transmit during the frame. The network interrupt handler and the conductor at the conductor station build this beat packet.

If desired, the conductor can be implemented in more than one station. In this embodiment, if the primary conductor fails, another station on the network can assume the role of the conductor in the event of such failure. Further, the current invention can be achieved through the means of a distributed reservation control system. If the other stations contain a conductor or its equivalent, each station can create its own reservation list. This can be accomplished by each station maintaining a reservation list based on received reservation requests. In such embodiment, it is not strictly necessary for one station to transmit the reservation list as part of the beat packet.

Each station also has a frame interrupt handler that queues data from a synchronous data stream as isochronous packets in a transmit pipeline buffer awaiting transmission. The frame interrupt handler also unloads isochronous packets from a receive pipeline buffer, and converts them to a synchronous data stream. A supervisor works asynchronous pipeline buffers to load and unload asynchronous control messages transmitted as asynchronous data packets. The reservation requests are transmitted as asynchronous data packets.

The network interrupt handler will maximize the transmission of isochronous data packets. Space in the communication frame is given first to isochronous data packets. Thereafter, remaining space is filled with asynchronous data packets until the frame is full.

The great utility of the invention is that the communication frame has maximum efficiency, while collisions between isochronous data packets is avoided.

The foregoing and other features and advantages of the invention will be apparent from the following more particular description of a preferred embodiment of the invention as illustrated in the accompany drawings.

DETAILED DESCRIPTION OF PREFERRED EMBODIMENTS

Figure 1:
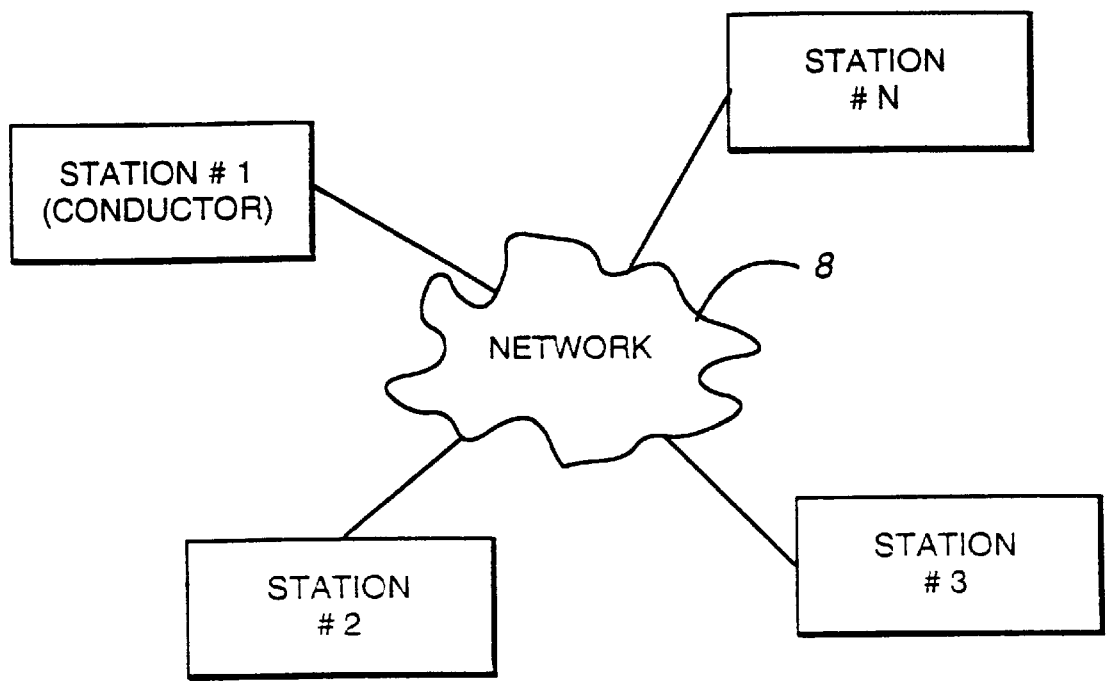
FIG. 1 illustrates a network of stations where each station is implemented in accordance with the invention.

In the network of FIG. 1, each of the stations connected to network 8 is implemented in accordance with the preferred embodiment of the invention. Station #1 is the conductor for the network and generates the beat packet that provides the timing for the network and a permission list to each of the stations. All stations receive the beat packet at the beginning of a frame. The permission list in the beat packet controls the sequence of transmission of isochronous data packets on the network by the various stations. This reservation list of isochronous or iso channels is used to generate a deferred time of transmission for iso channels from each station. An iso channel is an isochronous data packet with a defined destination station, or stations, in the network.

Each station generates a deferral value based on the position of its iso channel on the reservation list. An ordered persistent timer in each station uses the deferral value to control the timing of transmission of an iso channel from the station. Each station working with the OP timer schedules transmission times for iso channels when the network is active (packet is on the network) and initiates transmission of an iso channel (an isochronous packet) on 0 (zero) deferral for the iso channel.

For improved robustness, a conductor fail-over mechanism allows any station on the network 8 to assume the role of conductor in the event of a failure of the current conductor. In this embodiment, the conductor transmits a beat packet at a well defined interval. If the other stations detect that the conductor has failed to transmit the beat packet, all the other stations will transmit a beat packet of its own. Only a single station may assume the role of the conductor due to an arbitration procedure based on a previously published "conductor priority" value in the beat packet header. Stations with lower priority as identified by the "conductor priority" value yield to the highest priority conductor. Alternatively, the conductor priority" scheme could be stored in memory at each station, in which all of the stations would not need to transmit a beat packet.

Further, each station may maintain a reservation list based on received reservation requests. In this case, each station constructs a beat packet in memory as warranty against conductor failure. In normal operation, only the conductor station transmits the beat packet. In the event of conductor failure, however, multiple stations will possess an up-to-date beat packet immediately ready for transmission. This minimizes any interruption in network service during conductor fail-over.

Further, if the other stations have the capability to create their own reservation list, a distributed reservation and ordering system is available with the current invention. In this case, a reservation list would not need to be transmitted as part of the beat packet from the conductor. Each station in this embodiment monitors the network for reservation requests. With the reservation requests, each station can create a reservation list in a similar manner as the conductor. Because each station would use the same algorithm to create the reservation list, the reservation list would be identical from station to station.

Figure 2C:
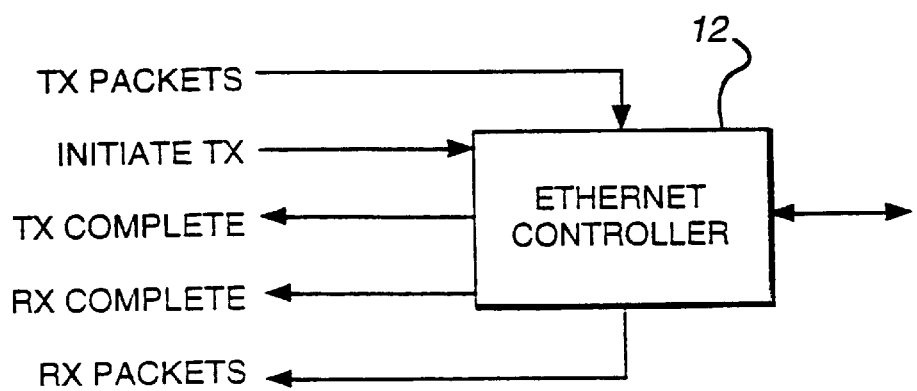
FIG. 2C shows the input/output data and signals for the Ethernet controller in FIGS. 2A and 2B.
Figure 2A:
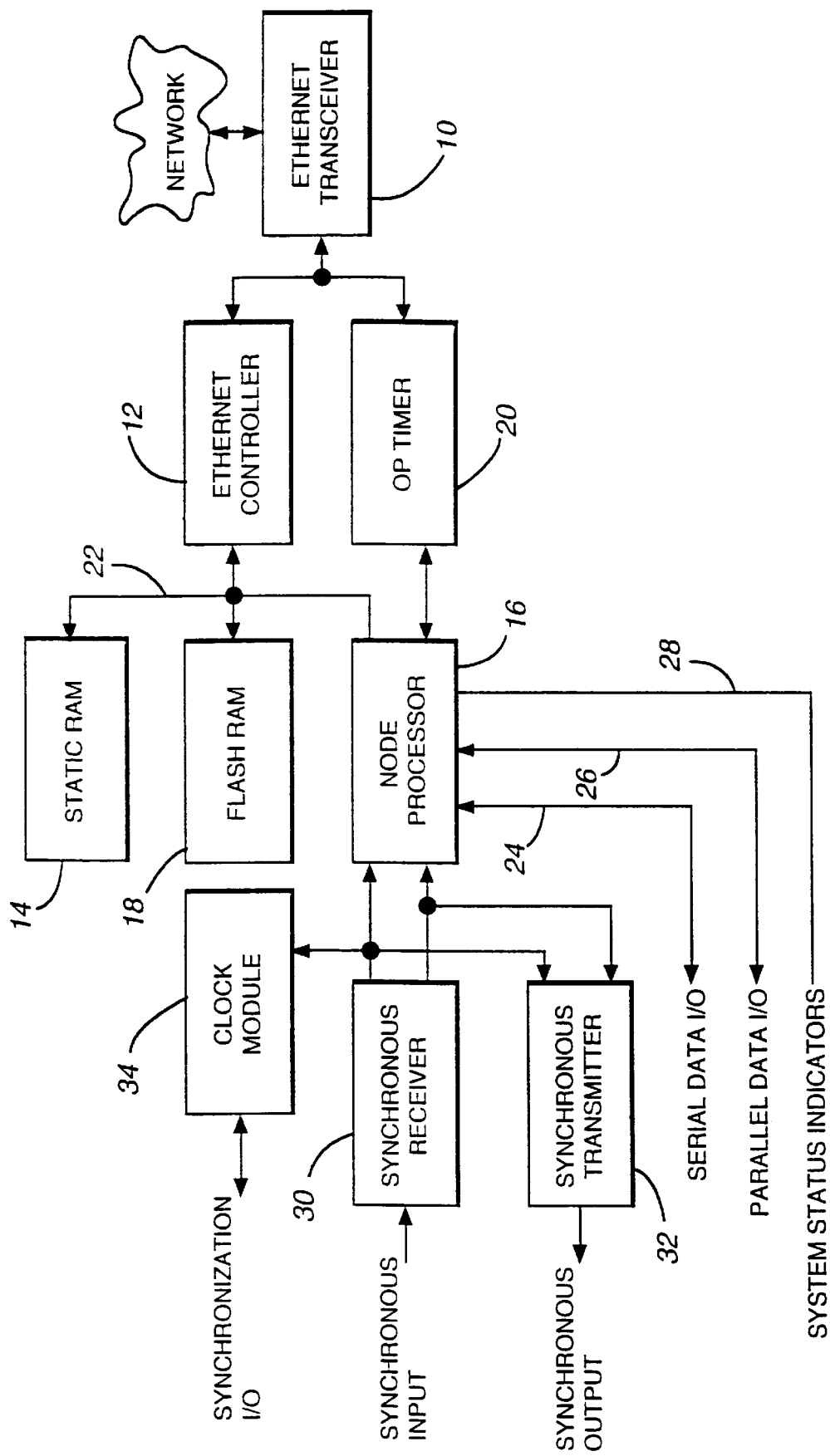
FIG. 2A illustrates a preferred embodiment for the station hardware of the invention.

FIG. 2A illustrates a preferred embodiment of a station, or node, hardware architecture in accordance with the invention. When the node is operating in a receive mode, Ethernet packets of information are received from the communication network at the Ethernet transceiver 10. From transceiver 10, the Ethernet packets go to the Ethernet controller 12. Controller 12 buffers the packets while they are being stored for processing in the node at the static RAM 14.

When the node is operating in a transmission mode, the node processor 16 will place the packets to be transmitted into static RAM 14. When the node or station is ready to transmit the packets, they are pulled from the static RAM 14 and sent out over the network link through the Ethernet controller 12 and the Ethernet transceiver 10.

Static RAM 14 is the main working storage for node processor 16. Flash RAM 18 is non-volatile storage storing the program code used by the node processor 16 and storing configuration information for the node, such as the station address.

The ordered persistent (OP) timer 20 monitors traffic on the network by monitoring Ethernet packets received by transceiver 10. The OP timer communicates with the node processor to indicate the presence, or absence, of traffic on the network. The operations of the OP timer will be described in detail hereinafter with reference to FIG. 4.

The node processor 16 is connected to the Ethernet controller 12, RAM 14 and RAM 18 through the address and data buses 22. Node processor 16 also has a serial data input/output (I/O) port 24, a parallel data I/O port 26, and a connection 28 to system status indicators. The serial data I/O port 24 is provided so that the node can transmit, or receive, low speed serial asynchronous data. The high-speed synchronous data is being handled by synchronous receiver 30 and synchronous transmitter 32.

An application of the serial data I/O port 24, in combination with the synchronous receiver 30, might be the transmission of an audio signal, such as music, from a CD Compact Disk. The music audio signal from the CD would be the synchronous input into synchronous receiver 30. The controls for the CD, such as selection of the track to be played, would be via the serial data I/O port 24.

Parallel data I/O port 26 has a similar purpose to serial data I/O port 24 in that it may also be used to pass input/output control signals associated with synchronous input/output data that is to be transmitted, or received, over the network.

Lines 28 connected to system status indicators provide diagnostic information about the node. The indicators are status lights that are controlled from node processor 16 to indicate status of the node—transmitting, receiving, failure, etc.

Note that data on the Ethernet controller side of the control processor is isochronous data. On the other hand, data at the synchronous receiver and synchronous transmitter is synchronous data. Thus, the control processor working with static RAM 14 is converting synchronous data to isochronous data, or vice-versa, depending on the direction of flow of data through the node.

The clock signals for timing control of the synchronous data are provided by clock module 34. Clock module 34 is a phase-locked loop. The timing signal to which this phase-locked loop is locked is a beat packet received from the network by Ethernet controller 12. The beat packet is the timing signal for the network, and is passed by the node processor 16 to the clock module 34 to lock the phase-lock-loop to the network timing.

Clock module 34 can also be locked to a clock at the local node. In this case, the synchronization of I/O data is from a local clock into the clock module 34, and the phase-lock-loop locks to that local clock. The node in FIG. 2A would then be the source of beat packet timing signals which would be sent out over the network through the Ethernet controller 12 and Ethernet transceiver 10.

A third possibility is that there could be a local clock and a separate network clock signal. In this situation, the node processor 16, with the phase-lock-loop clock module 34, would operate as a timing coordinator to convert signals between the local clock timing and the network clock timing.

In any of these three clock scenarios, the phase-lock-loop clock module 34 provides the clock signals for the synchronous receiver and the synchronous transmitter 32. In the simplest form, the synchronous receiver is connected to an analog-to-digital converter, and the synchronous transmitter is connected to a digital-to-analog converter.

Figure 2B:
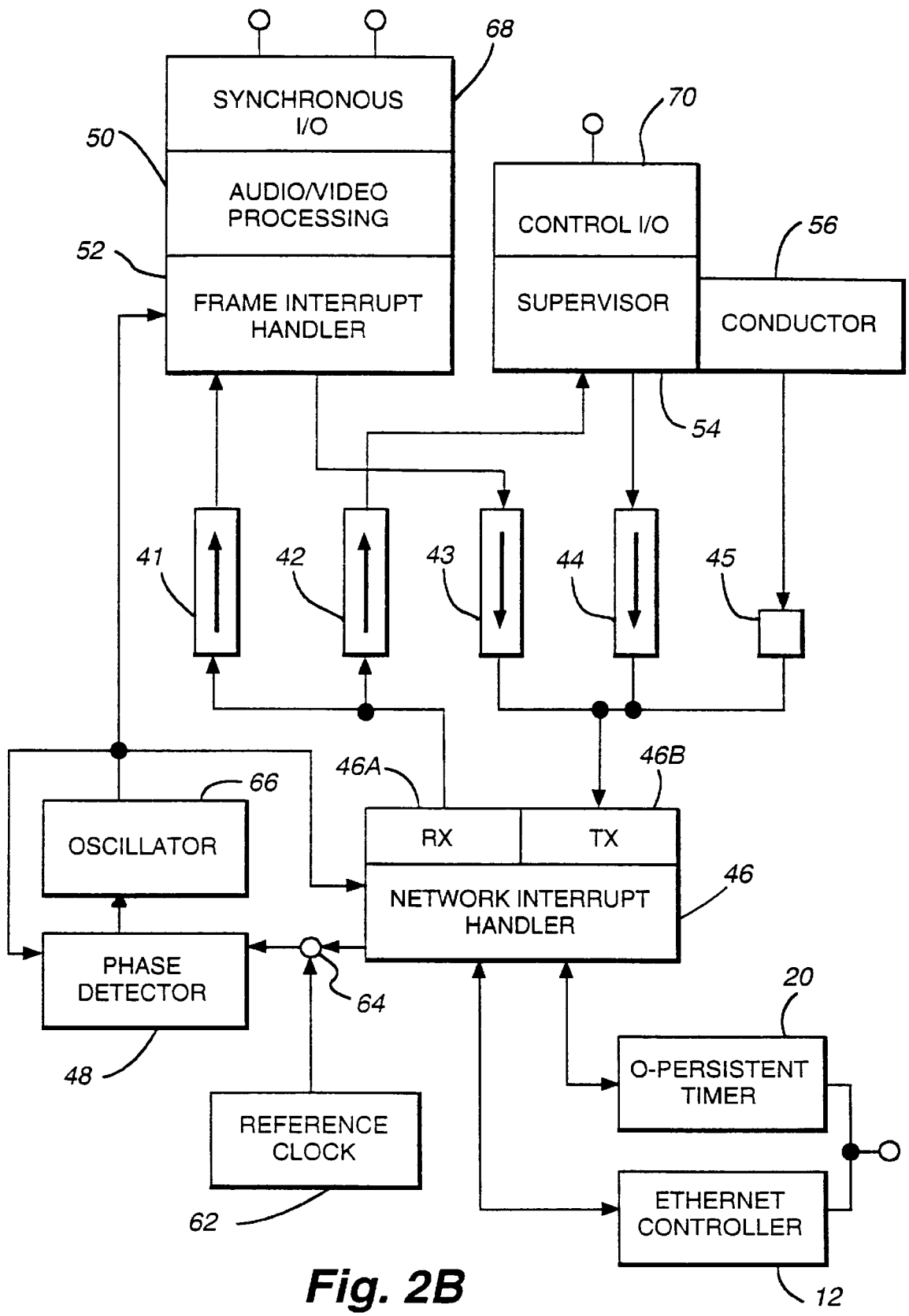
FIG. 2B shows the hardware and software elements of the preferred embodiment of the invention.

FIG. 2B illustrates the interaction between storage devices, hardware modules and software in the preferred embodiment to perform the operations of the invention. The storage devices are the pipeline, or FIFO, buffers 41, 42, 43 and 44, and beat packet buffer 45. The software includes the network interrupt handler 46., the phase detector 48, audio/video (or other synchronous data) processor 50, frame interrupt handler 52, supervisor 54, and conductor 56. The hardware components include OP timer 20, Ethernet controller 12, reference clock 62, clock source selector 64, oscillator 66, synchronous data input/output 68 (receiver 30 and transmitter 32 of FIG. 2A) and the control input/output ports 70 (ports 24 and 26 of FIG. 2A).

Network interrupt handler 46 is invoked any time there is an event on the network. The network events that invoke the handler come from either the Ethernet controller 12, or the ordered persistent (OP) timer 20. In the case of Ethernet controller 12, there are three possible events—(1) a packet has been transmitted, (2) a packet has been received, and (3) a network error has occurred. A packet transmission event only occurs if the Ethernet controller has been told to transmit a packet. The packet receive event can occur any time that a packet is received from the network.

In the case of the OP timer 20, there are two events that invoke the network interrupt handler. The first event is detection of a successful transmission of a packet. The second event is the timing out of a deferral interval.

In a packet receive event, the Ethernet controller 60 has received a packet with a destination address identifying this node as the destination. The destination address may be a specific address for this node, or it may be a multi-cast address where this node has been configured to receive packets with that multi-cast address.

When the network interrupt handler detects a receive packet event from the Ethernet controller, the RX (receive) module 46A detects whether the received packet contains isochronous data or asynchronous data. There is a marker in each packet to identify the type of data. If the packet contains isochronous data, then receive module 46A places the packet in queue, in FIFO buffer 41. If the receive packet contains asynchronous data, the packet is placed in FIFO buffer 42 by receive module 46A.

Illustrated in FIG. 2B are buffers to handle single channel receive and transmit of data. If the node is to handle multiple channel transmission and receipt of data in packets, then there would need to be additional sets of transmit and receive buffers, or FIFO pipeline type buffers, for each channel. The buffers 41–45 indicated in FIG. 2B are storage locations in static RAM 14 (FIG. 2A). Further, the buffers may be implemented as actual physical storage locations, or they may be pointers to the actual physical storage location.

Isochronous data from a packet is buffered in FIFO 41 until frame interrupt handler 52 is ready to process the data. Frame interrupt handler is a software module that is clocked by oscillator 66. In other words, the frame interrupt handler module is looking for an event which is the clock pulse from oscillator 66. When that event occurs, the frame interrupt handler 52 pulls isochronous data from buffer 41 to build a frame of synchronous data for processing by audio/video processor 50. The isochronous data may be either audio/video or any other data that has an isochronous or synchronous requirement. After the data is processed by processor 50, it is passed out over the synchronous I/O 68.

Asynchronous data received in a packet and then buffered in FIFO 42 is passed to a supervisor software module 54 and conductor 56. The supervisor module will recognize control signals from the asynchronous data and generate control signals on the I/O ports. For example, a control signal received as asynchronous data destined for the serial data I/O port 24 (FIG. 2A) would be recognized by the supervisor module 54 and sent out over the control I/O hardware. Asynchronous data sent to the conductor includes reservation requests, as will be described hereinafter.

During transmission mode, the synchronous data from an audio/video source comes into the node through the synchronous receiver in I/O 68, is processed by the processor 50, and is passed to the frame interrupt handler 52. Frame interrupt handler 52, when triggered by a clock signal from oscillator 66, places the synchronous data into FIFO buffer 43, Buffer 43 is effectively buffering isochronous data for transmission. Network interrupt handler 46, working with the Ethernet controller 60, will pull the isochronous data now in buffer 43 out of the buffer, build a Ethernet packet and send the Ethernet packet out onto the network.

Alternatively, the frame interrupt handler builds synchronous data packets;. These data packets are loaded/unloaded synchronously on the frame interrupt handler side of the FIFO buffers 41–44 and loaded/unloaded isochronously on the network interrupt handler side of the FIFO buffers.

The audio/video processor 50 and the audio/video source may be remotely controlled through the network by the node receiving asynchronous control signals. The asynchronous control signals from the network are received and passed through buffer 42 to the supervisor 54. Supervisor 54 passes the control signals to audio/video processor 50 directly or to the audio/video source or destination through control I/O 70.

During transmission mode, control data received through the control I/O 70 is handled by the supervisor 54. Supervisor 54 places the asynchronous control data into buffer 44.

The transmit (TX) module 46B pulls the asynchronous control data from buffer 44, and the network interrupt handler 46 working with the Ethernet controller 12 sends it out to a destination on the network. The timing by which the network interrupt handler transmits either isochronous data from buffer 43 or asynchronous data from buffer 44 out over the network through the Ethernet controller is described hereinafter with reference to FIG. 9.

FIG. 2C shows the input and output data and signals for Ethernet controller 12. The initiate TX command or signal comes from the network interrupt handler and a TX complete interrupt goes back to the network interrupt handler when the transmission of a packet from the station is completed. Controller 12 will buffer an initiate TX command until a TX complete occurs if the initiate TX command is received while the controller is already transmitting a packet. Also, the Ethernet controller will send a RX complete interrupt to the network interrupt handler when the controller has completed the reception of a packet from another station.

As described earlier with reference to FIG. 2A, the node may operate in a timing mode where it is slaved to clock messages from the network or it may operate in a timing mode where it is the master and is generating clock messages to be sent out onto the network. If the node is operating in the slave mode, the beat packet or timing message received through Ethernet controller 12 is processed at the network interrupt handler 46 and used to implement operations that lead to transmission of data from buffer 43 or buffer 44 out through Ethernet controller 12. At the same time, the timing message is passed by the network interrupt handler to the clock source selector 64. In slave mode, this source selector will pass the timing event to the phase detector 48 to lock the phase-lock-loop oscillator 66 to the beat of the network; i.e., the timing signal represented by the beat packet. If the node is operating as a master or conductor station and is the source of the beat packet, then timing pulses from oscillator 66 in this phase-lock-loop are passed back to the network interrupt handler 46. Interrupt handler 46, when it detects the clock pulse event from oscillator 66, sends out the beat packet message through the Ethernet controller 12. The beat packet message is generated by conductor 56 and stored in buffer 45. The beat packet that is transmitted is shown in FIG. 3.

Figure 3:
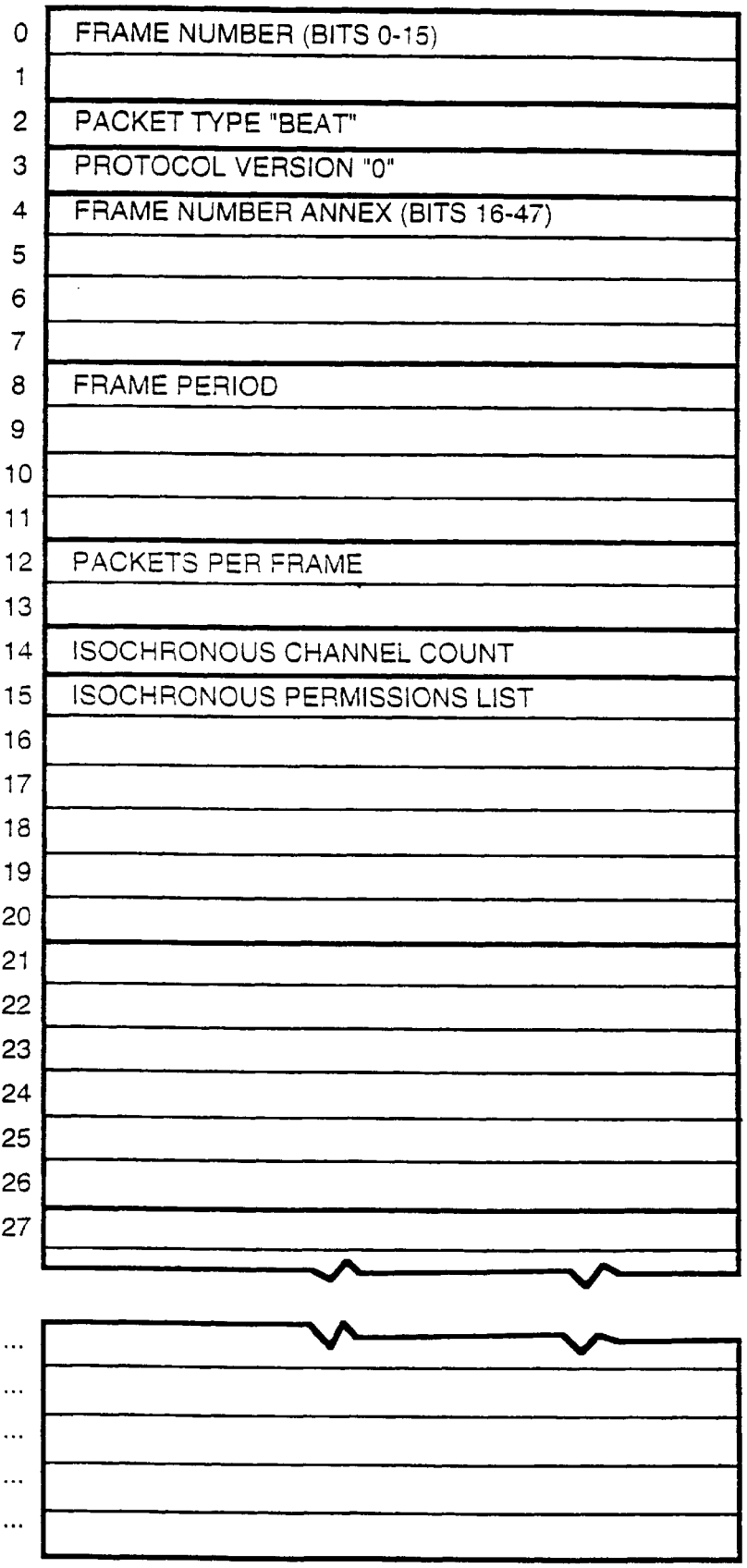
FIG. 3 shows the format of a beat packet.

As shown in FIG. 3, the beat packet begins with two bytes for a frame number. The frame number is advanced by one, each time the beat packet is transmitted. Accordingly, since the beat packet is transmitted on the timing event of the clock master pulse, the frame number indicates network time. The third byte (#2) in the beat packet identifies the packet as being the beat packet rather than another type of packet. The next byte in the beat packet is a version field to indicate to users of the network the version of the protocol that is currently operating. Next, are four bytes, 32 more bits of the frame number. Altogether, there are 48 bits or six bytes making up the frame number. The next four bytes indicate the frame period. Bytes #12 and #13 contain the maximum allowed number of packets per frame. Byte #14 contains the isochronous (iso) channel count. The remaining bytes contain the isochronous (iso) permissions list described hereinafter.

Figure 4:
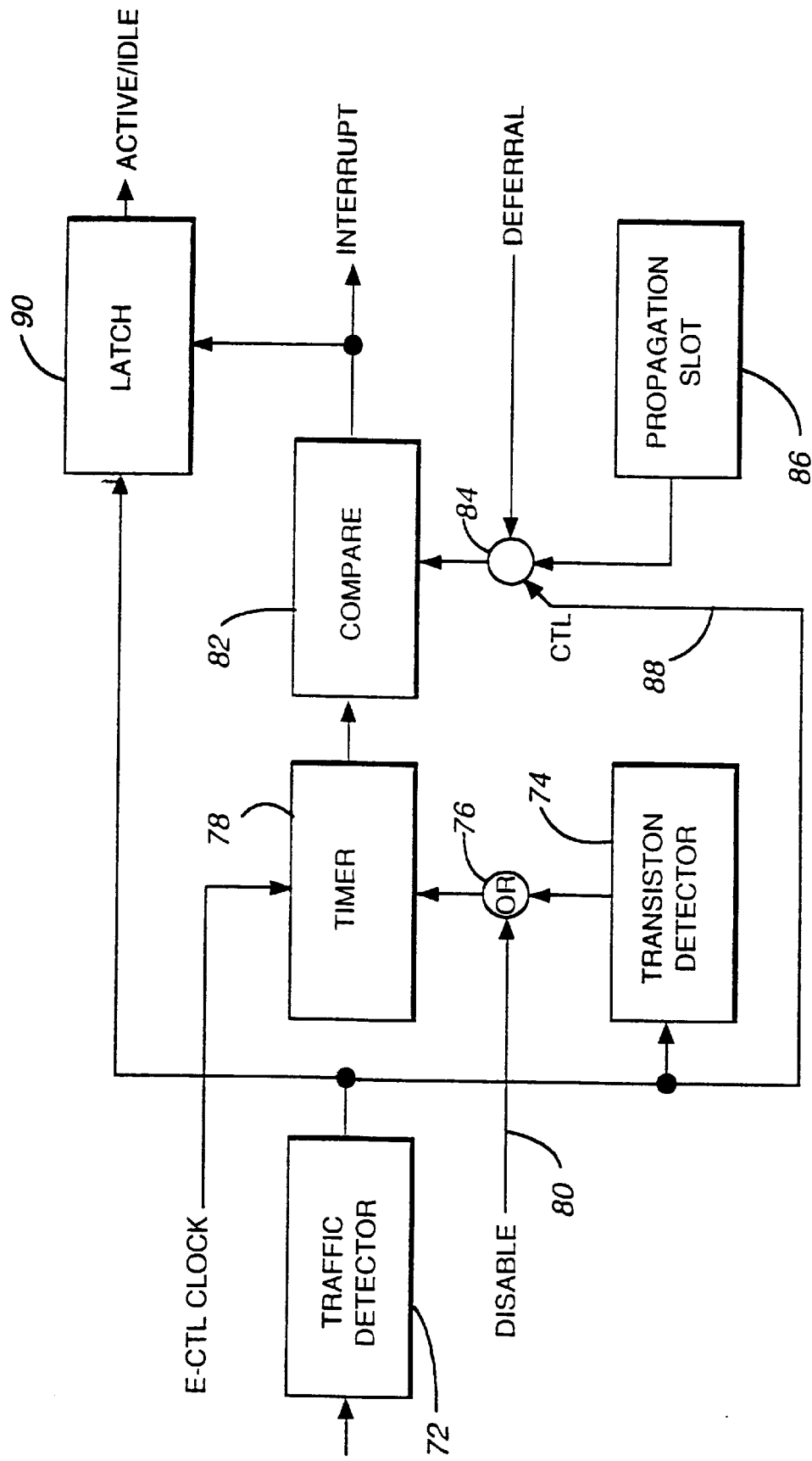
FIG. 4 shows the ordered persistent timer of FIGS. 2A and 2B.

The ordered persistent (OP) timer 20 in FIGS. 1 and 2B is shown in detail in FIG. 4. The OP timer is monitoring the traffic on the network as seen by the node. In other words, any packet transmitted onto the network by any other node in the network is received at the node and will be seen by the OP timer 20. Traffic detector 72 in FIG. 4 monitors this traffic and generates a binary one as it's output, if traffic is present, and a binary zero if no traffic is present. Each time there is a transition from active (traffic) to idle (no traffic) or idle to active, transition detector 74 produces a pulse. This pulse is passed by OR 76 to the reset input of timer 78. Timer 78 is reset every time there is a transition from active to idle or idle to active. Also, timer 78 is reset and held reset in the event a disable input is received from the node processor 16 (FIG. 2A) over input line 80.

Timer 78 is incremented by clock pulses from the Ethernet controller 12. The Ethernet controller clock runs asynchronous to the node clock. The controller clock generates a clock pulse that defines the period of a bit in the Ethernet packet. Accordingly, timer 78 advances one tick for each Ethernet bit period.

Comparator 82 compares the value in timer 78 with a value received through switch 84. Switch 84 passes either a set value from the propagation slot register 86, or a selectable deferral value received from the node processor 16 (FIG. 2A). Control line 88 which carries the active or idle signal from traffic detector 72 controls which value is passed by switch 84 to comparator 82. When the control line indicates the network is active, i.e., an Ethernet packet is being transmitted by some station, switch 84 passes a fixed value, five hundred twelve (512 bit periods is the minimum size of a packet) from register 86 to comparator 82. When the control line is carrying an idle signal, switch 84 passes the deferral value from the node processor.

The output of comparator 82 has two purposes. First, comparator 82 will generate an event output, an interrupt, if the size of an Ethernet packet is at least 512 bits. Since timer 78 is reset to zero at the beginning of a packet, and switch 84 is set to pass the value from the propagation slot register 86 during a packet, comparator 82 will have an output when the value from timer 78 reaches 512. The output from comparator 82 is passed as an interrupt back to the node processor 16, and also sets latch 90 to the current state, active or idle, of the signal from traffic detector 72. In this way, node processor 16 can detect from latch 90 the state of traffic on the network from the active or idle signal at the time an event occurs; i.e., at the time the interrupt signal occurs. In the present example where the traffic is active, latch 90 is set active.

The minimum size for a packet is 512 bits. Therefore, if a minimum size packet is being received, the traffic signal from traffic detector 72 could be transitioning from active to idle when comparator 82 detects the timer count has reached 512. For this reason, the traffic signal input to latch 90 is slightly delayed (less than a bit period) to make sure the traffic signal is still active when the interrupt from comparator 82 sets latch 90 while detecting a packet is on the network.

Traffic detector 72 in the OP timer also monitors traffic on the network for the purpose of detecting when the network is idle; i.e., no station is currently transmitting. In that situation, the traffic signal from traffic detector 72 goes low indicating the idle state. Transition detector 74 detects this transition of the traffic signal, and resets timer 78 through OR 76. And the idle state of the traffic signal also controls switch 84 to pass the deferral value rather than the propagation slot value. The deferral value is received from the node processor 16 (FIG. 2A).

The deferral value is set to one of a plurality of values depending on conditions on the network and at the local node as will be described hereinafter. In any event with switch 84 now passing the deferral value to comparator 82, the comparator generates an interrupt signal when the timer value in timer 78 equals the deferral value. The interrupt event now represents a predefined amount of idle time on the network, as defined by the deferral value. Latch 90 is set to idle, i.e. the current state of the traffic signal, by the interrupt signal from comparator 82. This idle state is read from latch 90 by the node control processor 16 to detect the network is idle. More particularly, the setting of latch 90 to the idle state indicates to the node processor 16 that the traffic on the network has been idle for the length of time equivalent to the deferral value.

The purpose of the deferral values in the ordered persistent timer circuit of FIG. 4 is to set the order in which the node expects to gain access to the network. Highest priority node would have a deferral value of zero, and with increasing deferral values the order of access of each node is specified. This is illustrated more particularly in the timing diagram of FIG. 9 described later herein.

Figure 5A:
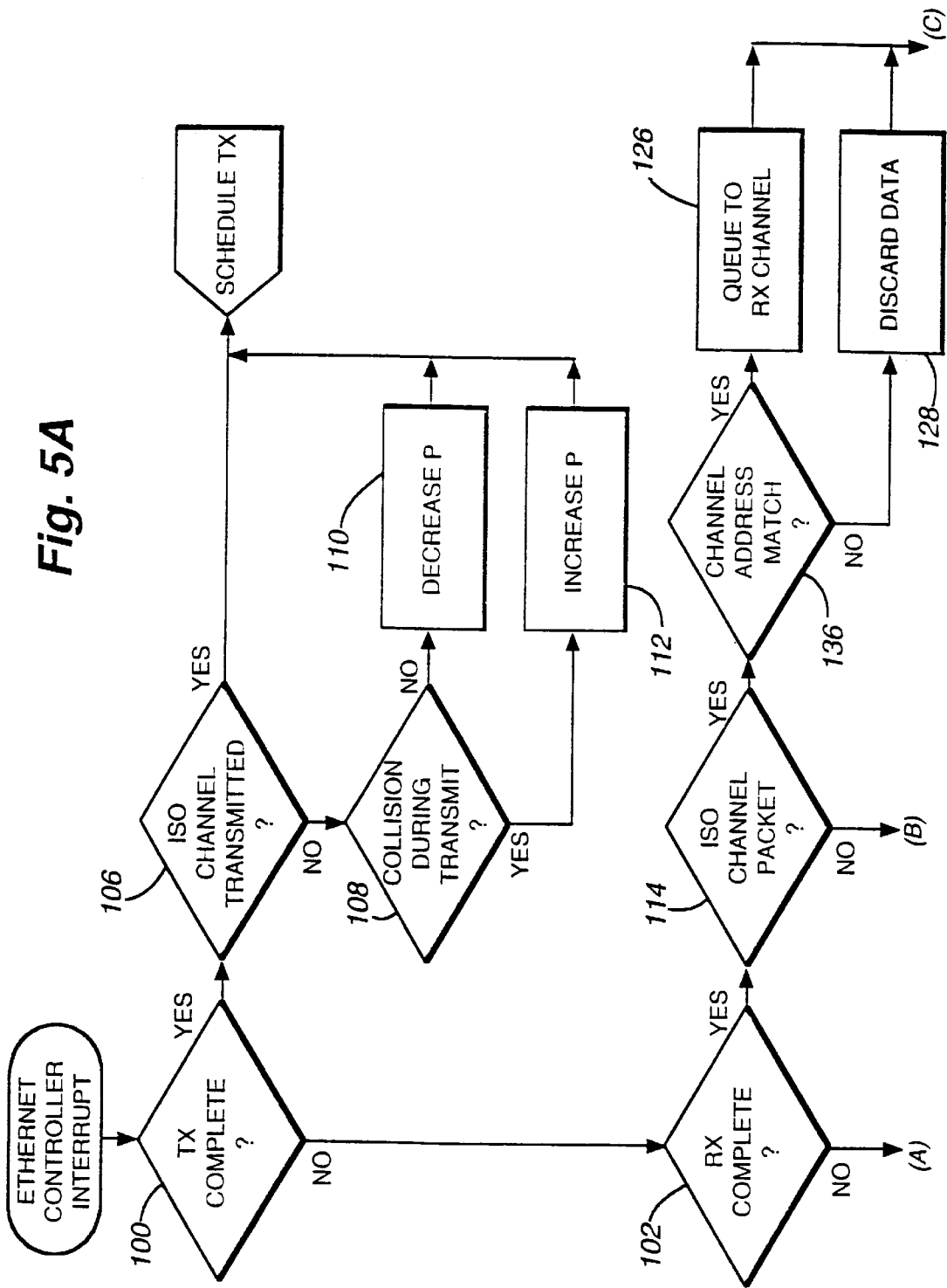
FIG. 5, composed of FIGS. 5A and 5B, illustrates the flow of operations performed by the network interrupt handler in FIG. 2B to handle with the Ethernet controller the transmission and reception of packets at the station.
Figure 5B:
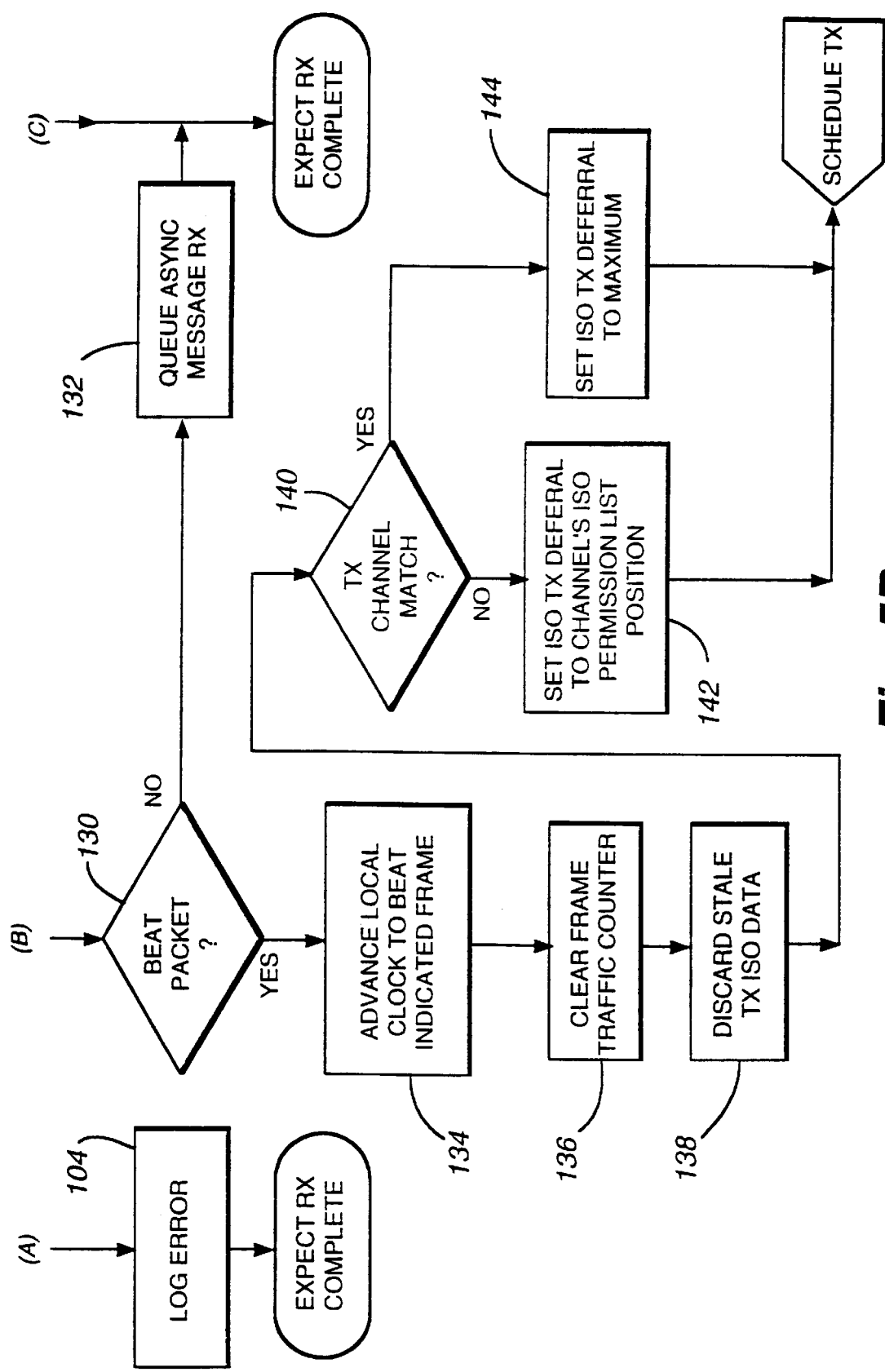
Figure 6:
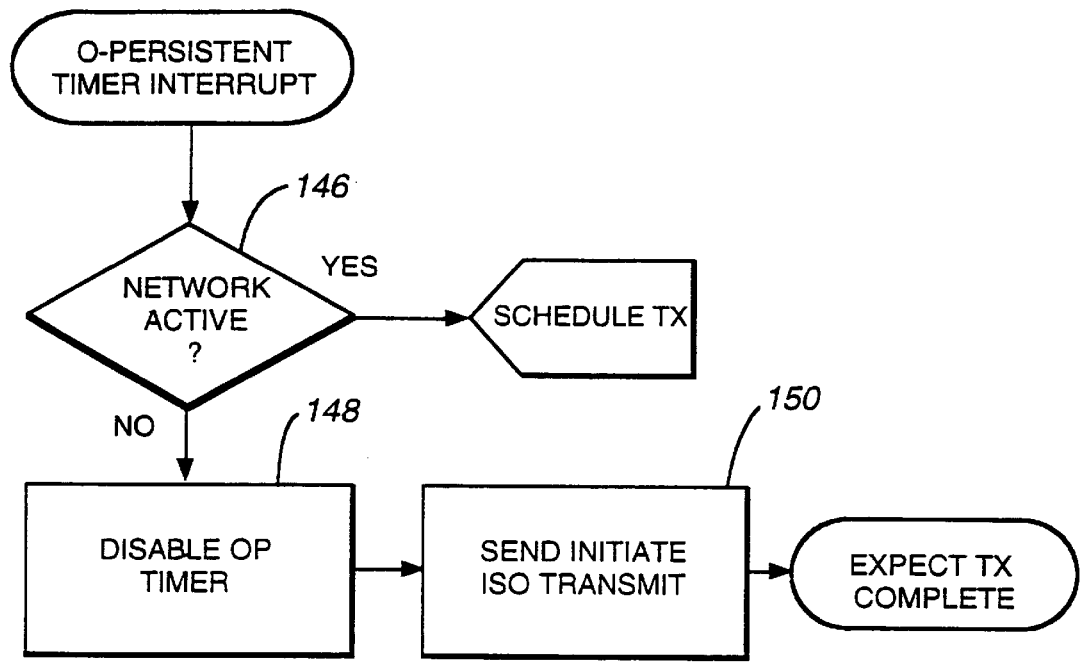
FIG. 6 illustrates the flow of operations performed by the network interrupt handler with the OP timer to schedule transmissions and to initiate transmissions.
Figure 7A:
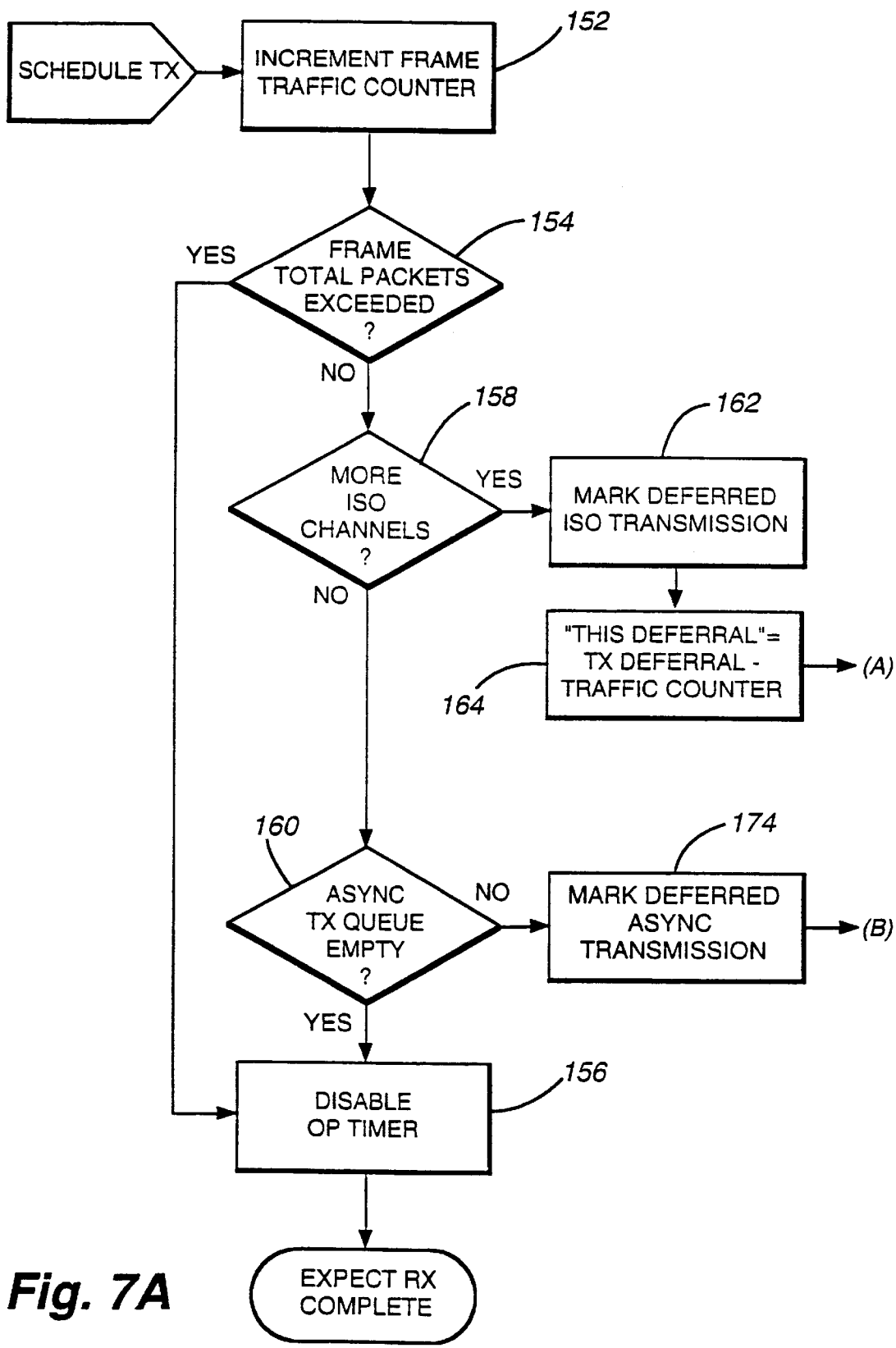
FIG. 7, composed of FIGS. 7A and 7B shows the operations for scheduling the transmission of isochronous and asynchronous data packets.
Figure 7B:
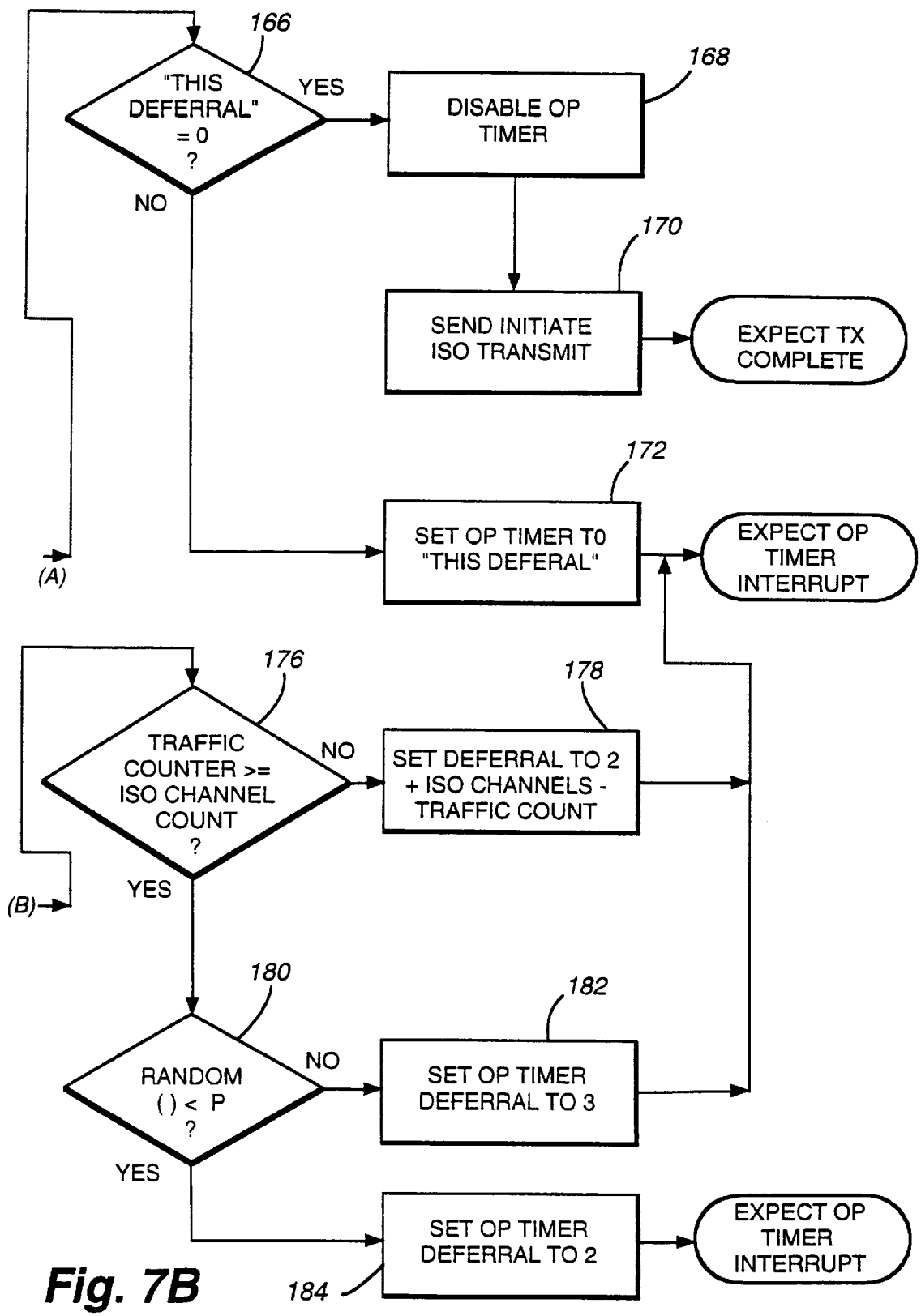

The network interrupt handler 46 of FIG. 2B is shown in detail in FIGS. 5, composed of FIGS. 5A and 5B, 6, and 7. FIG. 5 illustrates the logical operations of the network interrupt handler in response to interrupts from the Ethernet controller 12. FIG. 6 illustrates the operations of the network interrupt handler 46 in response to interrupts from the order persistent timer 20. FIG. 7, composed of FIG. 7A and 7B, illustrates the transmission schedule operations which are used to control or schedule transmissions in response to logical operations completed in FIGS. 5 and 6.

In FIG. 5, the network interrupt handler can respond to three interrupts from the Ethernet controller—transmission complete, receipt complete, or error. When the interrupt is received in FIG. 5, decision operation 100 checks for transmission complete, and decision operation 102 checks for receipt of an Ethernet packet being complete. If both of these test operations result in a Ano" result, then the interrupt must be for an error condition, and operation 104 logs the error. The interrupt handler then expects an RX (receive) interrupt.

Interrupt handlers are only invoked when an event occurs. When the interrupt handler completes, the processor resumes what it was doing when the event occurred. The termination points in the operation flows shown herein indicate the next normally expected event. This may or may not be the actual next event.

If the Ethernet controller interrupt corresponds to completion of a transmission of an Ethernet packet, the logical operation flow branches yes from decision operation 100 to decision operation 106. Decision operation 106 is testing whether or not the transmitted Ethernet packet was an isochronous channel transmission. If it was an isochronous channel transmission, then the operation flow branches "yes" to schedule the next transmission. The scheduling of transmissions is handled in FIG. 7 described hereinafter.

If the transmission complete interrupt was not an isochronous channel transmission, then the operation flow branches "no" from decision operation 106 to decision operation 108. A non-isochronous channel transmission means that transmission of an asynchronous Ethernet packet has taken place. Decision operation 108 is testing whether a collision occurred during that transmission. As will be described hereinafter, the control of asynchronous transmission is adaptive P-persistent control. Since the asynchronous transmission is not under ordered persistent control, it is possible that collisions will occur. Depending on whether a collision occurred during asynchronous transmission, the P variable will be increased or decreased. If there was no collision, P is increased. If there was a collision, P is decreased. The quotient 1/P represents an estimate of the number of stations on the network that are attempting to transmit simultaneously during the asynchronous portion of the frame. After P is increased or decreased, the operation flow proceeds to FIG. 7 to schedule the next transmission.

If the interrupt from the Ethernet controller represents completion of the receipt of an Ethernet packet, the operation flow passes to decision operation 114. There are three possible Ethernet packets. An isochronous packet, an asynchronous channel packet and a beat packet.

Figure 8:
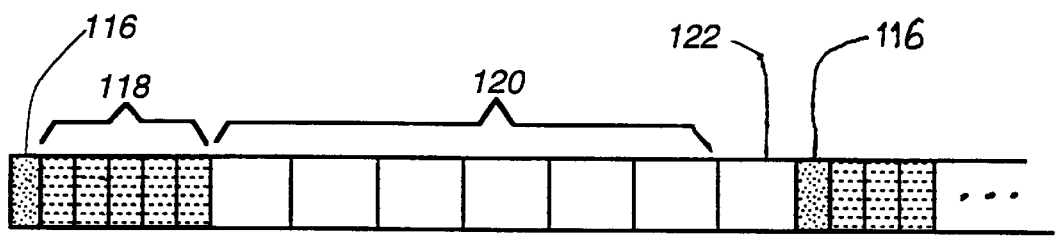
FIG. 8 shows the format of a transmitted frame having a beat packet, isochronous data packets and asynchronous data packets.

FIG. 8 illustrates the format of a network frame in a preferred embodiment of the invention. The frame begins with a beat packet 116. The beat packet is followed by a plurality of isochronous data packets 118. The isochronous data packets are followed by asynchronous data packets 120, and the asynchronous data packets are followed by an idle network test period 122.

Returning to FIG. 5, if decision operation 114 detects that an isochronous data packet has been received, then the operation flow branches to decision operation 124. Decision operation 124 is testing whether or not the isochronous data packet has an address that the node has been configured to receive. If the address matches, queuing module 126 queues the isochronous data packet into the isochronous FIFO buffer 41 (FIG. 2B). On the other hand, if there is no channel address match, then the isochronous data packet is discarded by operation 128. In either case, after the isochronous data packet is queued or discarded, the network interrupt handler 46 then expects the next RX interrupt.

In the event the Ethernet packet received is not an isochronous data packet, decision 114 branches the operation flow to decision operation 130.

Decision operation 130 is testing whether the packet that is not an isochronous data packet is a beat packet. If the data packet is not a beat packet, it must be an asynchronous data packet. In that event, the operation flow branches "no" from decision operation 130 to queue module 132. Queue module 132 queues the asynchronous data packet in FIFO buffer 42 (FIG. 2B). If the data packet is a beat packet, then decision operation 130 branches the operation flow to step 134.

At step 134, if the node is a slave node, clock module 34 (FIG. 2A) is advanced to the time indicated by the beat packet frame number. Clear operation 136 then clears the frame traffic counter. The frame traffic counter counts the number of Ethernet packets received since the last beat packet. The count is reset to zero each time a beat packet is received.

After the local clock has been updated, the local isochronous data packets queued for transmission in FIFO 43 are checked against the local clock. Each isochronous data packet carries a time stamp. If the isochronous data packet is stale, i.e. the local clock has advanced past the time stamp in the isochronous data packet awaiting transmission, then the isochronous data packet is discarded from the FIFO queue 43 (FIG. 2B). Discard module 138 carries out these operations of comparing the time stamp to the local clock and discarding stale isochronous data packets from queue 43.

This completes the maintenance functions associated with receiving a beat packet. After step 138, the operations for setting up the transmission of isochronous data packets begin. Decision operation 140 checks to see if there is a transmission channel match between any entry in the permission list in the beat packet and the present node.

As shown in FIG. 3, the beat packet contains a isochronous permission list starting at byte #15 in the beat packet. The number of isochronous channels that will be transmitted in the frame is defined by the isochronous channel count stored at byte #14 in the beat packet. Accordingly, the count in byte #14 indicates how many isochronous channel permissions will be listed in the list starting at byte #15. Each entry in the isochronous permission list is 6 bytes long. The entry contains the intended destination address of transmissions for that channel.

Referring briefly again to FIG. 2B, conductor 56 at the conductor station, builds the permission list, as hereinafter described, from reservation requests from other stations and from its own node control processor 16. When a channel has a message originating at a slave station, the slave station generates an Ethernet packet having a source address and a destination address plus the isochronous data. This packet is stored in the FIFO 43 of the slave station awaiting transmission. The slave station generates a reservation request from the supervisor 54 which is stored in the asynchronous data queue 44. When the slave station sends the reservation request from FIFO 44 over to the conductor station, the conductor 56 can then build the permission list in the next beat packet.

Returning now to FIG. 5, the decision operation 140 is detecting whether or not there is a transmission channel match between the contents of an isochronous data packet in queue 42 and an entry on the permission list in the beat packet just received. More particularly, decision 140 is looking for a match between the destination address in the packet at the head of TX queue 43, and the destination address in one of the entries of the permission list in the beat packet. If there is a match, then operation 142 detects the position on the permission list, and sets the deferral value in accordance with the position on the permission list. If there is no match, then operation 144 sets the deferral value to a maximum value. The deferral value is equal to a deferral number, i.e., the position on the permission list, multiplied by 512.

Figure 9:
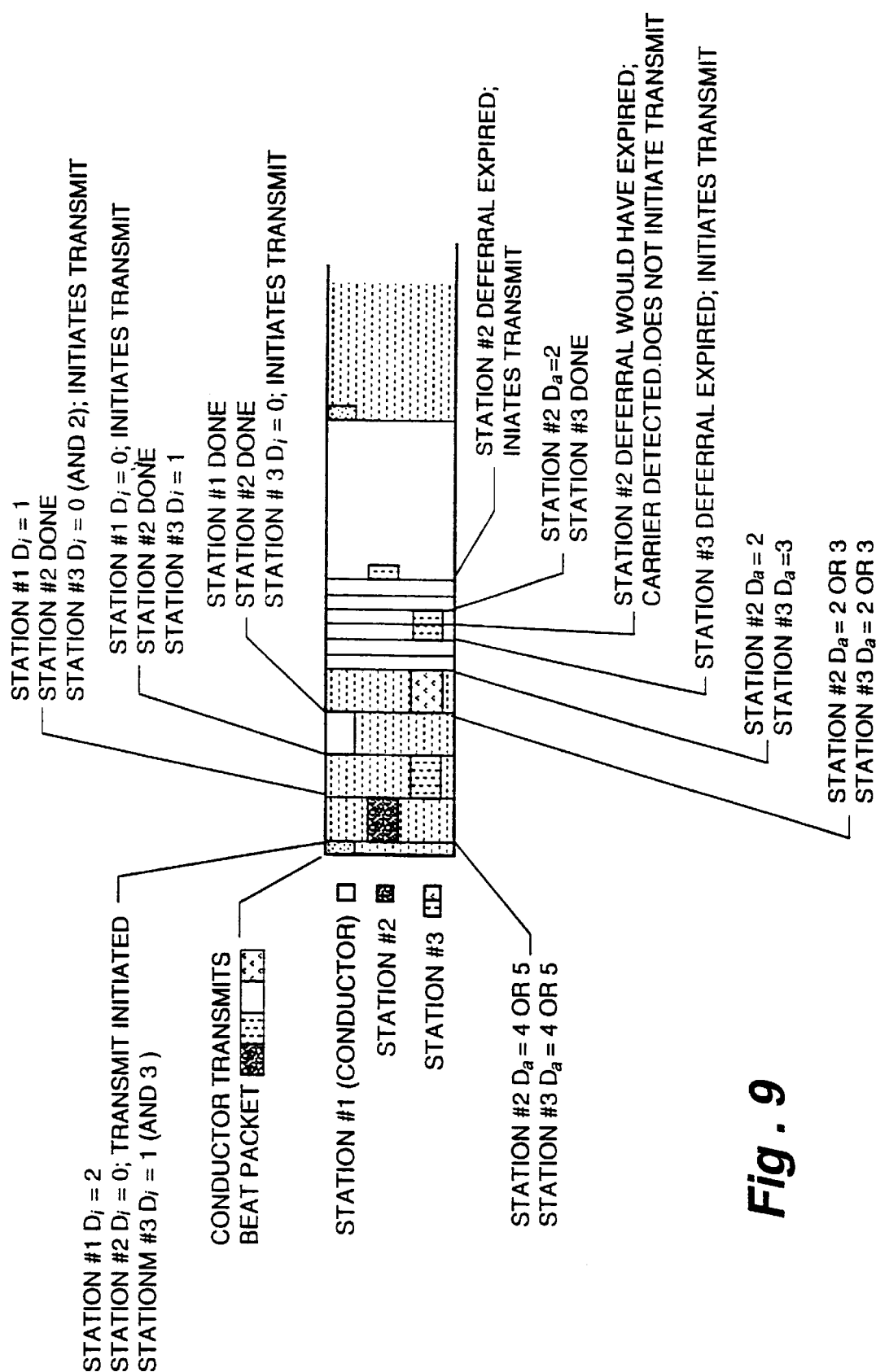
FIG. 9 is a timing diagram for the transmission of isochronous and asynchronous data packets in a network such as FIG. 1 having stations as shown in FIGS. 2A and 2B.

FIG. 9 is a timing diagram for an example of three nodes, or stations, operating in accordance with the invention. The relative timing of packets in FIG. 9 illustrate the relationship of channels, beat packets, isochronous data packets, asynchronous data packets and deferral values for multiple stations or nodes. The beat packet permission list 147 contains four entries on the permission list specifying the sequence of transmission of isochronous data packets from the stations. Station 1 is the conductor station and sends the beat packet with the permission list. In the beat packet permission list, station two has first position, station three which intends to transmit two channels has second and fourth positions, and station one has third position. These positions on the permission list equate to a deferral number of zero for station two, deferral numbers one and three for the two channels respectively at station three, and deferral number two for the channel at station number one. To arrive at the deferral value, the deferral number is multiplied times 512. Thus, the deferral value for station two is zero, for station one is 1,024, and for the two channels at station three, 512 and 1,536, respectively. As described earlier with reference to FIG. 4, these deferral values control when the OP timer generates an interrupt under idle network conditions.

FIG. 6 illustrates the operations in the network interrupt handler 46 (FIG. 2B) in response to an event detected at the OP timer 20 (FIG. 2B), When an OP timer interrupt is generated at OP timer 20, decision operation 146 detects whether the network was active or idle at the exact time of the event. If the network is active, this indicates another channel or packet is being transmitted. The operation flow branches "yes" in this event from decision 146 to schedule the next transmission using the transmission scheduling routine in FIG. 7. If the network is idle, the operation flow branches from decision operation 146 to step 148. An idle condition detected at step 146 indicates the deferral value or interval has expired. After the idle state is detected, step 148 disables the OP timer, and step 150 initiates the deferred transmission of a data packet marked in operation 162 or operation 174 of FIG. 7. After the deferred transmission is initiated, the interrupt handler expects a transmission (TX) complete interrupt.

Another embodiment of the current invention can be achieved without the persistence or an OP timer. In this embodiment, transmission on the network can be determined by counting packets following the beat packet or waiting to receive a designated previous transmission. The packet counting function of the timer can be achieved through other means known to those of ordinary skill in the art. The deferral timing function is simply a means to assure continued smooth operation of the network in the event of individual transmitter failure.

The transmission scheduling module in the network interrupt handler is shown in FIG. 7. The scheduling module is called from either FIG. 5 or FIG. 6. The logical operations of the scheduling module begin at operation 152 which increments the frame traffic counter by one. The frame traffic counter counts the number of packets transmitted on the network since the beginning of the frame; i.e., since the receipt of the beat packet. The frame traffic counter was reset or cleared in operation 136 (FIG. 5). Traffic counter 152 is incremented each time the station in which the traffic counter is located transmits an Ethernet packet or each time the OP timer at the station detects transmission of a packet by another station.

After the frame traffic counter is incremented, decision operation 154 detects whether the total number of packets counted for the frame exceeds a frame total as specified by the beat packet in the packets per frame at byte #12. If decision step 154 detects that the total number of packets counted exceeds the frame total specified in the beat packet, then no further packets should be transmitted. Accordingly, the operation flow branches "yes" from decision operation 154 to disable operation 156. Disable operation 156 disables the OP timer which effectively stops any further transmission of packets from the station. If the frame traffic count does not exceed the frame total, then the operation flow branches from decision 154 to decision operation 158.

Decision operation 158 is testing whether the isochronous data transmission FIFO 43 in FIG. 2B is empty. In other words, have all of the isochronous data packets from the station already been transmitted? If so, the operation flow branches from operation 158 to decision operation 160. Decision operation 160 is testing whether the asynchronous data transmission queue 44 is empty. If all of the asynchronous data packets from the station have also already been transmitted, then the operation flow branches yes from decision operation 160 to step 156 to disable the OP timer. The network interrupt handler then expects the next RX interrupt.

If there is an isochronous data packet queued for transmission in FIFO queue 43 (FIG. 2B), then the operation flow branches "no" from decision operation 158 to mark operation 162. Operation 162 marks the deferred isochronous data packet at the top of the queue 43 for transmission. Then, step 164 generates the current deferral number for the deferred isochronous data packet marked by step 162. The current deferral number is found by updating the packet's original deferral number. The original deferral number is specified by the channel's position, 0, 1, 2, 3, 4, etc., in the iso permission list in the beat packet. The current deferral number is equal to the original deferral number minus the count in the frame traffic counter. Accordingly, if the original deferral number was three and the frame traffic counter is two, then the current deferral number is one.

When the current deferral number is determined, decision operation 166 tests whether the current deferral number is equal to zero. If it is equal to zero, then step 168 disables OP timer. This insures that the OP timer will not generate an interrupt during transmission. Step 170 initiates the transmission of the marked isochronous data packet at the top of the queue 43 (FIG. 2B). Thereafter, the network interrupt handler expects the TX complete interrupt.

If the deferral number does not equal zero as detected by decision operation 166, then the OP timer is set to the current deferral value as calculated by step 172. This is done by multiplying the current deferral number times 512 and passing the result as the deferral value to the OP timer. After step 172 sets this deferral value to the OP timer, the network interrupt handler expects the next RX interrupt. This completes the scheduling of an isochronous data packet transmission from a station.

If the isochronous data packet queue 43 is empty, then decision operation 160, as described above, checks the asynchronous data packet queue 44. If the asynchronous data packet queue 44 does contain a packet ready for transmission, the operation flow branches from decision operation 160 to step 174. In step 174, the asynchronous data packet at the top of queue 44 is marked for transmission. Decision operation 176 then tests whether the frame traffic counter value is greater than or equal to the isochronous channel count. The isochronous channel count is provided in the beat packet and corresponds to the number of entries on the isochronous packet permission list, which is the number of expected isochronous channel packets to be transmitted during the frame. If the count in the frame traffic counter is not greater than or equal to the isochronous channel count, then the operation flow branches "no" to set deferral module 178. Module 178 sets the deferral number to 2+the isochronous channel count−the traffic count. This deferral number will provide a deferral value high enough to essentially guarantee that the isochronous data packet transmissions for all channels will be completed before an asynchronous data packet is transmitted by this station.

If the count in the frame traffic counter is greater than or equal to the isochronous channel count, then the operation flow branches "yes" from decision 176 to decision operation 180. In decision operation 180, logical operations 180, 182, and 184 implement a P persistent logical operation in an effort to schedule asynchronous data packet transmissions from one station channel at a time. In decision module 180, a random number is generated and compared against a P value. As discussed above, the P value represents the percentage or probability that another station will be transmitting. By setting the deferral to a lower value, two, in step 184, the current station is going to transmit before stations setting a deferral number to a higher value, three, as in step 182. After the OP timer deferral is set to a higher value in step 182, the next expected event is an RX interrupt. If the deferral value or number is set lower as in step 184, the network interrupt handler expects an OP timer interrupt. This use of the OP timer to perform P persistent scheduling does not guarantee there will be no collisions in asynchronous transmissions. In other words, the asynchronous transmissions are P persistent and not ordered persistent because of the manner in which the network interrupt handler works with the OP timer.

This completes the scheduling operations performed in the network interrupt handler 46 (FIG. 2B) for the network side of the FIFO buffers 41–44. On the synchronous side of the FIFO buffers, the frame interrupt handler 52 performs the logical operations illustrated in FIG. 10.

Figure 10:
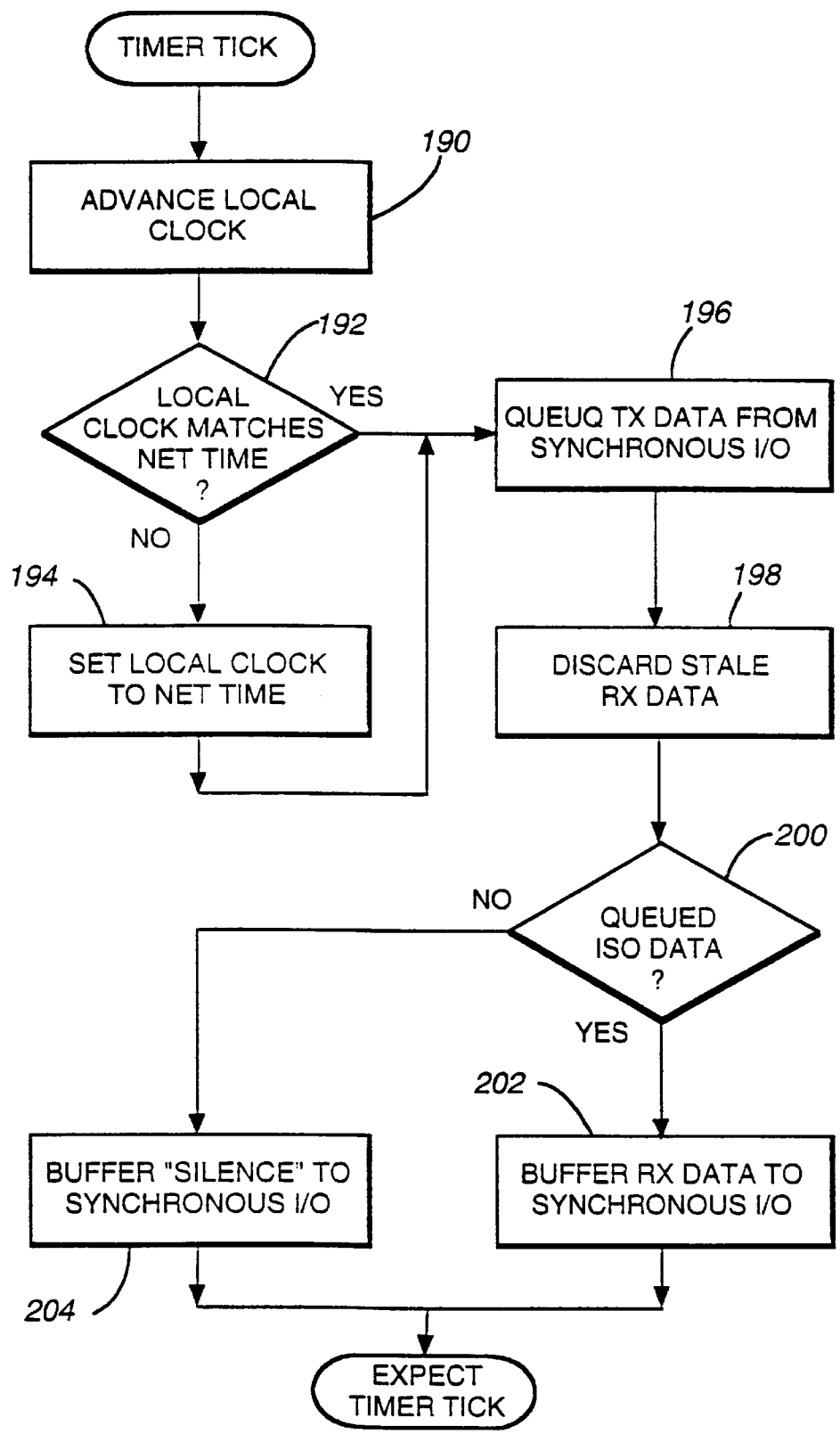
FIG. 10 shows the logical operations performed by the frame interrupt handler working with the synchronous I/O and the isochronous data buffers.

FIG. 10, when a timer tick is received, operation 190 advances the local clock. Recall that the timer tick is from a phase lock loop and will be either locked to a reference clock if the station is operating as the conductor, i.e. a master station, or will be locked to the network clock if the station is a slave station. Operation 192 checks whether the time in the local clock matches the network time. If the local time matches the network time, the process flows directly to queue module 196.

In the frame interrupt handler, queue module 196 queues synchronous data from the synchronous I/O and audio/video processor 50 and loads that synchronous data into TX FIFO buffer 43 (FIG. 2B). Accordingly, each time there is a timer tick, synchronous data is loaded into an isochronous packet on the TX FIFO buffer.

To handle received packets, operation 198 in the frame interrupt handler checks for stale isochronous data packets at the top of the queue in RX FIFO buffer 41; i.e., the next packet in queue 41 to be processed by the synchronous data processor 50. Operation 198 discards any stale data packet as it reaches the top of the RX queue. This is accomplished by comparing the time stamp on the RX isochronous data packet at the top of the queue with the local clock time. The RX packets are generally discarded only at start up when the network system is synchronizing itself.

After stale RX isochronous packets are discarded, decision operation 200 tests whether there is isochronous data remaining in queue 41. If there is, the operation flow branches to operation 202 to buffer the received isochronous data packet in the synchronous I/O 68 (FIG. 2B) until the destination synchronous I/O device is ready for the data. If there is no queued isochronous data in buffer 41, then step 204 buffers blank video and/or silence into synchronous I/O 68. In either event, buffering by step 202 or buffering by step 204, the frame interrupt handler then expects the next timer tick.

Figure 11:
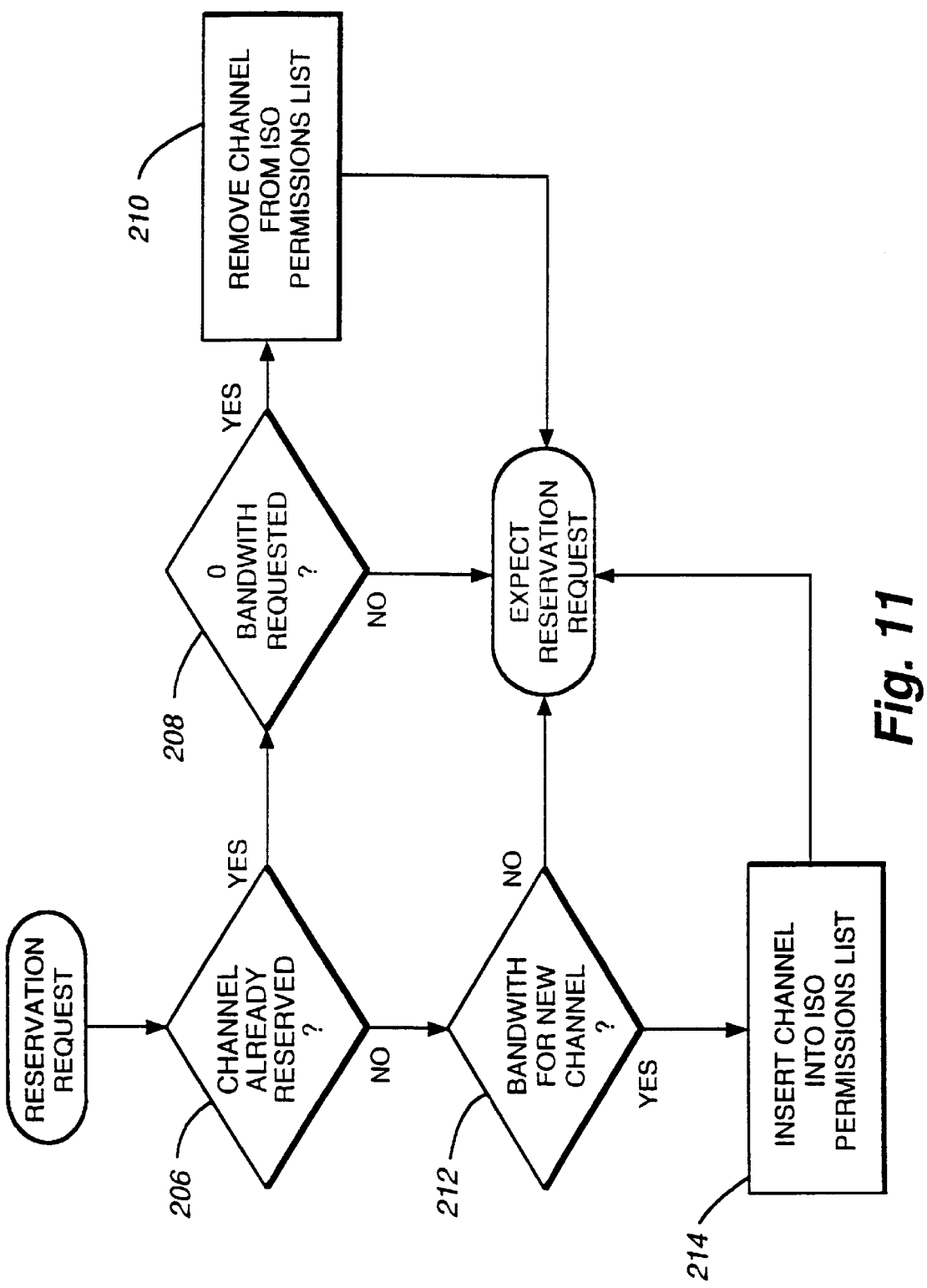
FIG. 11 illustrates the logical operations performed by conductor 56 (FIG. 2B) in handling an asynchronous request.

FIG. 11 illustrates the logical operations performed by conductor 56 (FIG. 2B) in handling an asynchronous request. As discussed earlier, the conductor generates the beat packet shown in FIG. 3. The beat packet contains the permission list for transmission during a frame. If a channel or station wishes to get on that permission list, it sends a reservation request to the conductor through the supervisor 54 in FIG. 2B.

When a reservation request is received, decision operation 206 checks whether the channel is already reserved. The reservation request contains the channel number, the priority of the channel, and the estimated bandwidth to be used by the channel. If the request is for a channel that has already reserved a packet in the frame, then decision operation 206 branches yes to decision operation 208. Decision operation 208 is testing or looking for a zero bandwidth request for the channel. A zero bandwidth request corresponds to turning off the channel. If there is a zero bandwidth request detected, then the operation flow branches to step 210, and step 210 removes the channel from the iso permissions list in the beat packet. After the channel is removed from the permission list, the request handler in the conductor is expecting the next reservation request.

If decision operation 208 detects the bandwidth requested was not zero, this indicates the channel was already reserved. No new channel, or no additional packet for the channel is granted. The operation flow branches "no", and the conductor expects the next reservation request.

If the decision operation 206 detects that the channel has not already been reserved, then decision operation 212 tests whether or not there is enough bandwidth for the new channel. Operation 212 detects the "Network Exhausted Flag." If the network was not detected to be exhausted, the flow branches to operation 214. Operation 214 inserts the channel into the iso permission list in the beat packet. After the channel is inserted into the permission list, the operation flow returns to the conductor expecting the next reservation request. If the network was detected to be exhausted, then the operation branches "no," expecting the next reservation request. As a result, the channel is not inserted into the permission list.

Figure 12:
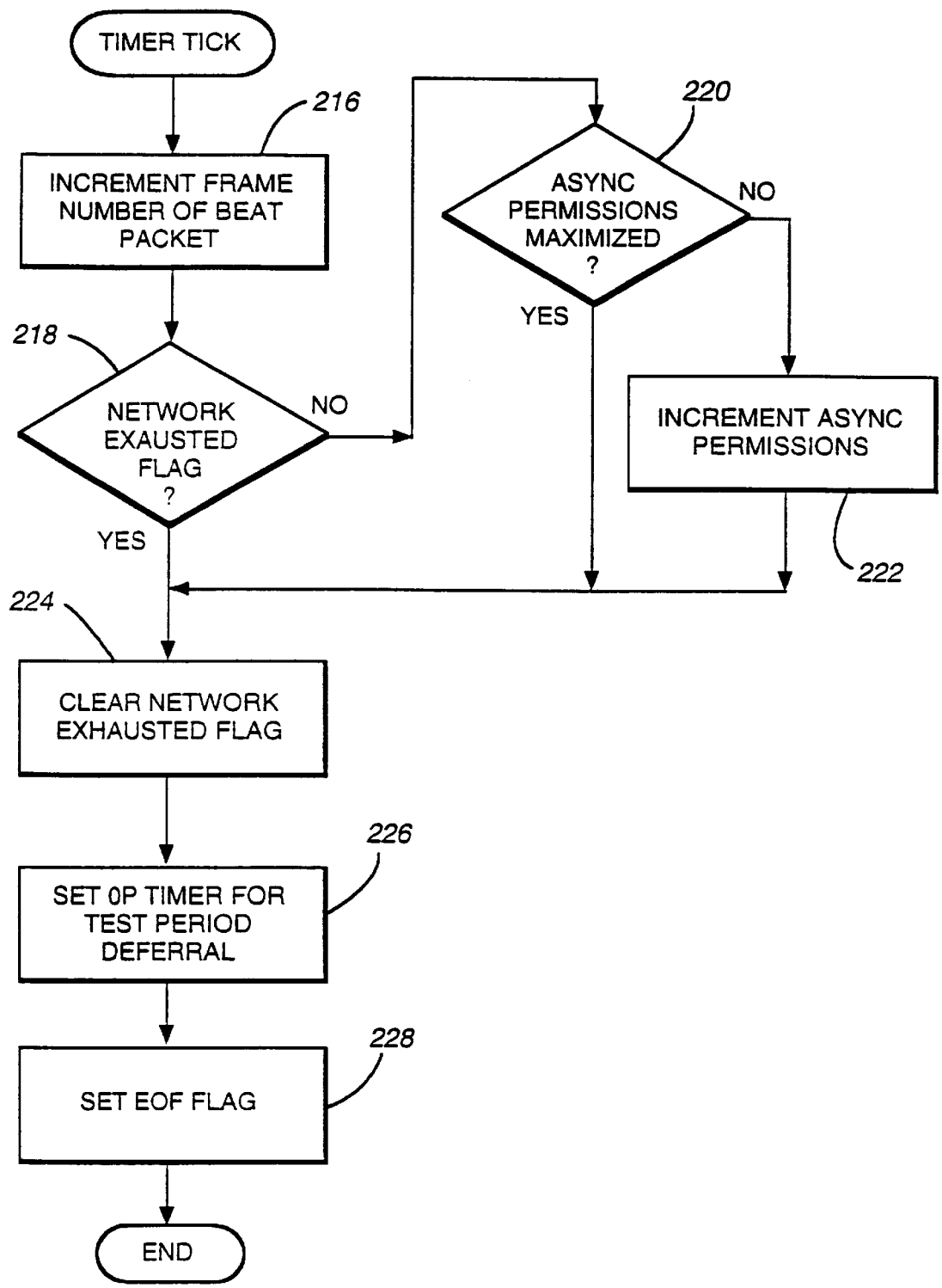
FIG. 12 illustrates additional operations performed by the frame interrupt handler in response to a timer tick event.

FIG. 12 illustrates additional operations performed by the frame interrupt handler 52 (FIG. 2B) in response to a timer tick event. The logical operations in FIG. 12 begin with the receipt of a timer tick from the master clock at the station. Since the conductor is setting the timing for the network, i.e. conductor is only operative in the conductor station or master station, it will be receiving from its own clock the network timing. Thus, the timer tick is the trigger for the operations in FIG. 12. The logical operations begin by incrementing the frame number field of the beat packet image in buffer 45 at step 216. After step 216 increments the frame number of the beat packet, decision operation 218 tests whether the network exhausted flag has been set. The network exhausted flag is set by the operations in FIG. 13 described hereinafter. If the network exhausted flag is set, it indicates that the entire bandwidth of the network is in use.

If the network exhausted flag has not been set, then the operation branches "no" from decision operation 218 to decision operation 220. Decision operation 220 tests whether or not the asynchronous permissions (packets per frame) have reached a maximum value for the frame. The number of packets in the frame should not exceed a reasonable maximum number of packets derived from the frame rate and the network bit rate. This reasonable maximum number of packets is the maximum value used in the test performed by operation 220. If the operation flow branches "no" from both operation 218 and operation 220, there is more space for asynchronous packets in the frame. Step 222 increments by one the packets per frame in the beat packet image in buffer 45. Thereafter, the operation flow returns to clear module 224.

Likewise, if the network exhausted flag has been set, or if the flag was not set but the asynchronous permissions were maximized, the operation would flow to clear module 224 also. Clear module 224 clears the network exhausted flag since the flag is only active for one frame. Clearing the flag prepares the conductor to handle the next frame.

After the network exhausted flag is cleared, operation 226 sets the OP timer for the test period deferral. After the end of a frame, there is a test period between frames; i.e., before the next beat packet is transmitted. Step 226 sets this test period deferral value for the OP timer 20 (FIG. 2B) so that the OP timer can detect that the idle state is occurring during the test period or can detect a problem in that another station is transmitting during the test period. The end of frame processing in FIG. 12 concludes with operation 228 which sets the end of frame (EOF) flag.

Figure 13:
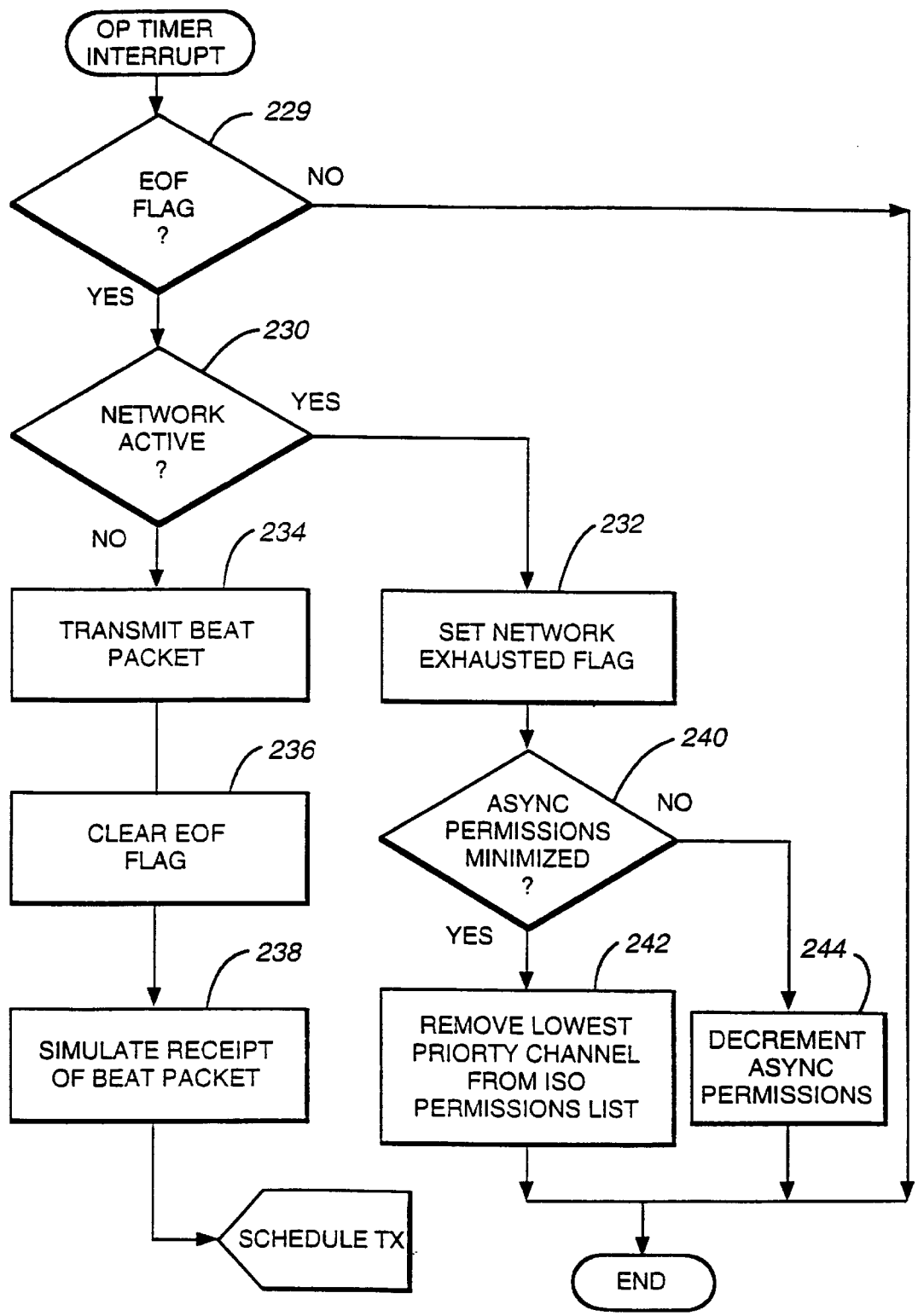
FIG. 13 illustrates additional operations performed by the network interrupt handler 46 during an OP timer event.

FIG. 13 illustrates additional operations performed by the network interrupt handler 46 (FIG. 2B) during an OP timer event. When an OP timer interrupt is received, decision operation 229 tests whether the EOF flag has been set. If not, the operation flow expects the next OP timer interrupt. If the EOF flag is detected, then decision operation 230 tests whether or not the network is active or idle. An idle state is expected, as all stations should have finished transmissions before the end of frame. If the network is active, the operation flow branches "yes" to step 232 to set the network exhausted flag. In other words, a station on the network is still transmitting and the network is overcommitted. If the network is idle as expected, then the operation flow branches to operation 234 to transmit the beat packet from buffer 45 thus beginning the next frame.

After the beat packet is transmitted, step 236 clears the EOF flag, and step 238 simulates receipt of the beat packet at the conductor station. This is necessary since the beat packet is sent from the conductor station, and the conductor station needs also to act as if it had received the information in the beat packet. After the receipt of the beat packet is simulated at the conductor station, the station enters the schedule transmission operation flow described above in FIG. 7.

If the network is active as detected in decision operation 230, the network exhausted flag is set at step 232, the next operation is decision operation 240 which tests whether or not the async permissions are minimized. If the asynchronous permissions have already been minimized, meaning that network bandwidth exhaustion is being caused by isochronous channels filling up the frame, then the operation flow branches from decision operation 240 to remove module 242. Remove module 242 removes the lowest priority isochronous channel from the isochronous permission list. After the iso channel is removed, the conductor expects the next OP timer interrupt.

If on the other hand the asynchronous permissions for transmission in the frame have not been minimized, the operation flow branches "no" from operation 240 to operation 244. Operation 244 decrements by one the packets per frame. The operation flow then expect the next OP timer interrupt.

An alternative approach to detecting network saturation as illustrated in FIGS. 12 and 13 offers reduced complexity and improved reliability. In this scheme, the conductor 56 is not required to monitor the activity on the network to detect saturation. Instead, individual stations do not initiate transmission, even if granted permission to do so, if the end of the frame is approaching. Stations then report any such failure to transmit events back to the conductor 56 in their periodic reservation requests. After receiving reports of failed transmissions, the conductor 56 may choose to revoke some permissions and/or deny additional reservation requests.

Although the stations in the foregoing description have been transmit and receive stations, the present invention also comprises receive-only stations. Instead of requesting slots in the frame for transmission, the receive-only station transmits a reverse reservation request onto the network. When receivers transmit reverse reservations, transmitters are able to determine when a station is actually listening. Transmitters do not need to consume network bandwidth with their data transmissions unless there is a station actually listening. Reverse reservation also inform transmitters of the network address(es) of intended receiver(s). The date may then be specifically addressed to these receivers allowing for more efficient delivery through some network technologies such as switched Ethernet and Asynchronous Transfer Mode (ATM) networks. The reverse reservation request indicates that the receive only station desires to receive isochronous and/or asynchronous data packets from one or more other stations. As with the transmit/receive stations, the receive-only station receives the beat packet from the conductor 56. If isochronous data packets are received, the frame interrupt handler at the receive-only station coverts such packets into output data in the same manner as discussed above with respect to transmit/receive stations. Preferably, the receive-only station contains the elements set forth in FIG. 2A, except for OP timer.

While the invention has been particularly shown and described with reference to preferred embodiments thereof, it will be understood by those skilled in the art that various other changes in the form and details may be made therein without departing from the spirit and scope of the invention.

What is claimed is:

1. In a communications network having a plurality of stations, a media control system for controlling the transmission of data in communications frames on the network, the media control system comprising:

means for building a timing packet for transmission to the stations, the timing packet containing timing information and a reservation list indicating sequence of transmission of packets in the frame;

at least one station of the plurality of stations, comprising:

means for receiving the reservation list in the timing packet;

means for detecting an active state and an idle state of the network, the network being in the active state when a station is transmitting and being in the idle state when no station is transmitting; and means, operably connected to the detecting means, for scheduling transmission of one or more data packets by the station based on the sequence set forth in the reservation list in the timing packet.

2. A station amongst a plurality of other stations in a communications network, including a distributed media control system for controlling the transmission of data in communications frames on the network, the plurality of stations transmitting reservation requests for data transmission onto the network, said station comprising:

means for receiving reservation requests from one or more of the other stations from the network;

means, operably connected to the receiving means, for building a reservation list indicating sequence of transmission of packets in the frame;

means for detecting an active state and an idle state of the network, the network being in the active state when a station is transmitting and being in the idle state when no station is transmitting; and means, operably connected to the detecting means, for scheduling transmission of one or more data packets by the station based on the sequence set forth in the reservation list.

3. In a communications network having a plurality of stations, a distributed media access control apparatus at the stations for controlling the transmission of isochronous data in communication frames on the network, the communication frames having a portion of the frame allocated to isochronous data packets, said media access control apparatus comprising:

a conductor at each station building a reservation list indicating the sequence of transmission of isochronous data packets in the frame;

a frame interrupt handler converting input data to isochronous data packets for transmission from the station and for converting isochronous data packets received from other stations into output data;

a counter responsive to the reservation list and generating an interrupt when an isochronous data packet at the station is to be scheduled for transmission; and a network interrupt handler in response to the reservation list and the interrupt for scheduling an isochronous data packet for transmission by the station.

4. A station for only receiving data in a communications network having a plurality of other stations, at least one of the other stations acting as a control station including a media access control apparatus for controlling transmission of isochronous data in communications frames on the network, the communication frames having a portion of the frame allocated to isochronous data packets, the receive only station comprising:

a means for transmitting a reverse reservation request onto the network, the reverse reservation request indicating that the receive only station desires to receive data packets from one or more of the other stations;

a means for receiving a timing packet, the timing packet transmitted onto the network by the control station and containing timing information;

a frame interrupt handler converting isochronous data packets received from the other stations into output data.

5. A station for only receiving data in a communications network having a plurality of other stations, at least one of the other stations acting as a control station including a media access control apparatus for controlling transmission of isochronous and asynchronous data in communications frames on the network, the communication frames having a first portion of the frame allocated to isochronous data packets and a second portion of the frame allocated to asynchronous data packets, the receive only station comprising:

a means for transmitting a reverse reservation request onto the network, the reverse reservation request indicating that the receive only station desires to receive data packets from one or more of the other stations;

a means for receiving a timing packet, the timing packet transmitted onto the network by the control station and containing timing information;

a frame interrupt handler converting isochronous data packets received from the other stations into output data; and a means for obtaining asynchronous data packets from another station.

* * * * *